(12) United States Patent
Islam et al.

(10) Patent No.: US 12,004,131 B2
(45) Date of Patent: Jun. 4, 2024

(54) EXTENSION OF AN EVALUATION PERIOD OF INTEGRATED ACCESS BACKHAUL MOBILE TERMINATION DUE TO COMMUNICATION OF THE CO-LOCATED INTEGRATED ACCESS BACKHAUL DISTRIBUTED UNIT

(71) Applicant: QUALCOMM Incorporated, San Diego, CA (US)

(72) Inventors: Muhammad Nazmul Islam, Littleton, MA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 17/393,350

(22) Filed: Aug. 3, 2021

(65) Prior Publication Data

US 2023/0052095 A1 Feb. 16, 2023

(51) Int. Cl.
*H04W 72/0446* (2023.01)
*H04L 5/00* (2006.01)
*H04W 24/08* (2009.01)

(52) U.S. Cl.
CPC ....... *H04W 72/0446* (2013.01); *H04L 5/0048* (2013.01); *H04W 24/08* (2013.01)

(58) Field of Classification Search
CPC ............. H04W 72/0446; H04W 24/08; H04W 88/085; H04W 48/16; H04L 5/0048; H04L 5/0053; H04L 5/0051
See application file for complete search history.

(56) References Cited

U.S. PATENT DOCUMENTS

| 10,979,925 | B2* | 4/2021 | Lin ..................... H04L 5/0048 |
| 2020/0229115 | A1* | 7/2020 | Qi ......................... H04W 80/08 |
| 2020/0374735 | A1* | 11/2020 | Wei ..................... H04L 5/0091 |
| 2021/0058917 | A1* | 2/2021 | Abedini ............. H04B 7/15542 |
| 2021/0126694 | A1* | 4/2021 | Abedini ................. H04L 5/005 |
| 2021/0143959 | A1* | 5/2021 | Xu ........................ H04W 40/22 |

(Continued)

FOREIGN PATENT DOCUMENTS

CN 100362821 C * 1/2008 ............. H04L 12/28

OTHER PUBLICATIONS

NTT DOCOMO, Inc., "Discussion on enhancements to support NR backhaul links", 3GPP TSG RAN WG1 Meeting #94bis, R1-1811359, Chengdu, China, Oct. 8-12, 2018, Total pp. 8 (Year: 2018).*

(Continued)

*Primary Examiner* — Shah M Rahman
(74) *Attorney, Agent, or Firm* — Procopio, Cory, Hargreaves & Savitch LLP

(57) ABSTRACT

The apparatus may be a first device at a first IAB node or the first IAB node itself. The IAB node may be configured to receive a configuration for a first set of reference signals associated with an IAB-MT function of the IAB node, wherein the first set of reference signals overlaps in time with a second set of time periods associated with an IAB-DU function of the IAB node. The IAB node may further be configured to extend an IAB-MT reference-signal measurement period based on the overlap between the first set of reference signals for measurement with the IAB-MT function of the IAB node and the second set of time periods associated with the IAB-DU function of the IAB node.

29 Claims, 20 Drawing Sheets

(56) References Cited

U.S. PATENT DOCUMENTS

| | | | |
|---|---|---|---|
| 2021/0185550 A1* | 6/2021 | Abedini | H04W 48/16 |
| 2021/0266128 A1* | 8/2021 | Zhang | H04L 5/0051 |
| 2021/0282228 A1* | 9/2021 | Si | H04L 27/261 |
| 2021/0345321 A1* | 11/2021 | Wu | H04W 16/10 |
| 2021/0368481 A1* | 11/2021 | Jo | H04W 72/27 |
| 2021/0400660 A1* | 12/2021 | Wei | H04W 80/02 |
| 2022/0061010 A1* | 2/2022 | Harada | H04W 56/001 |
| 2022/0141074 A1* | 5/2022 | You | H04L 27/2646 375/262 |
| 2022/0141686 A1* | 5/2022 | Korhonen | H04L 5/0048 370/252 |
| 2022/0167254 A1* | 5/2022 | Miao | H04W 72/0446 |
| 2022/0167397 A1* | 5/2022 | Thangarasa | H04W 74/08 |
| 2022/0232600 A1* | 7/2022 | Kim | H04L 1/08 |
| 2022/0303924 A1* | 9/2022 | Dahlman | H04L 5/0091 |
| 2022/0330066 A1* | 10/2022 | Raghavan | H04W 56/001 |
| 2022/0330141 A1* | 10/2022 | Qi | H04W 76/28 |
| 2022/0369121 A1* | 11/2022 | Islam | H04W 56/001 |
| 2023/0036240 A1* | 2/2023 | You | H04W 84/04 |
| 2023/0228837 A1* | 7/2023 | Kazmi | G01S 5/021 455/456.1 |

OTHER PUBLICATIONS

ZTE, "IAN scenarios and evaluations", 3GPP TSG RAN WG1 Meeting #93, R1-1806025, Busan, Korea, May 21-25, 2018, Total pp. 6 (Year: 2018).*

NTT DOCOMO, Inc., "Resource multiplexing between child and parent links of an IAB node", 3GPP TSG RAN WG1 #105-e, R1-2105716, e-Meeting, May 10-May 28, 2021, Total pp. 7 (Year: 2021).*

Qualcomm Inc., "Resource management for enhanced duplexing", 3GPP TSG RAN WG1 #105-e, R1-2104691, e-Meeting, May 10-May 28, 2021, Total pp. 9 (Year: 2021).*

Vivo, "Enhancement to resource multiplexing between child and parent links", 3GPP TSG RAN WG1 #105-e, R1-2104382, e-Meeting, May 10-May 28, 2021, Total pp. 7 (Year: 2021).*

Huawei et al., "Resource multiplexing between backhaul and access for IAB duplexing", 3GPP TSG RAN WG1 #105-e, R1- 2104246, e-Meeting, May 10-May 28, 2021, Total pp. 13 (Year: 2021).*

* cited by examiner

EXTENSION OF AN EVALUATION PERIOD OF INTEGRATED ACCESS BACKHAUL MOBILE TERMINATION DUE TO COMMUNICATION OF THE CO-LOCATED INTEGRATED ACCESS BACKHAUL DISTRIBUTED UNIT

TECHNICAL FIELD

The present disclosure relates generally to communication systems, and more particularly, to an integrated access backhaul (IAB) mobile termination (MT) (IAB-MT) function with a co-located IAB distributed unit (DU) (IAB-DU) function.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first device at a first IAB node. The first device may be a processor and/or modem at the first IAB node or the first IAB node itself. The IAB node may be configured to receive a configuration for a first set of reference signals associated with an IAB-MT function of the IAB node, where the first set of reference signals overlaps in time with a second set of time periods associated with an IAB-DU function of the IAB node. The IAB node may further be configured to extend an IAB-MT reference-signal measurement period based on the overlap between the first set of reference signals for measurement with the IAB-MT function of the IAB node and the second set of time periods associated with the IAB-DU function of the IAB node.

In another aspect of the disclosure, a method, a computer-readable medium, and an apparatus are provided. The apparatus may be a first device at a first base station. The first device may be a processor and/or modem at the first base station or the first base station itself. The base station may be configured to configure an IAB node for measurement of a first set of reference signals with an IAB-MT function of the IAB node. The base station may further be configured to configure the IAB node with a scaling factor for extending an IAB-MT reference-signal measurement period based on an overlap between the first set of reference signals for measurement with the IAB-MT function of the IAB node and a second set of time periods associated with the IAB-DU function of the IAB node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
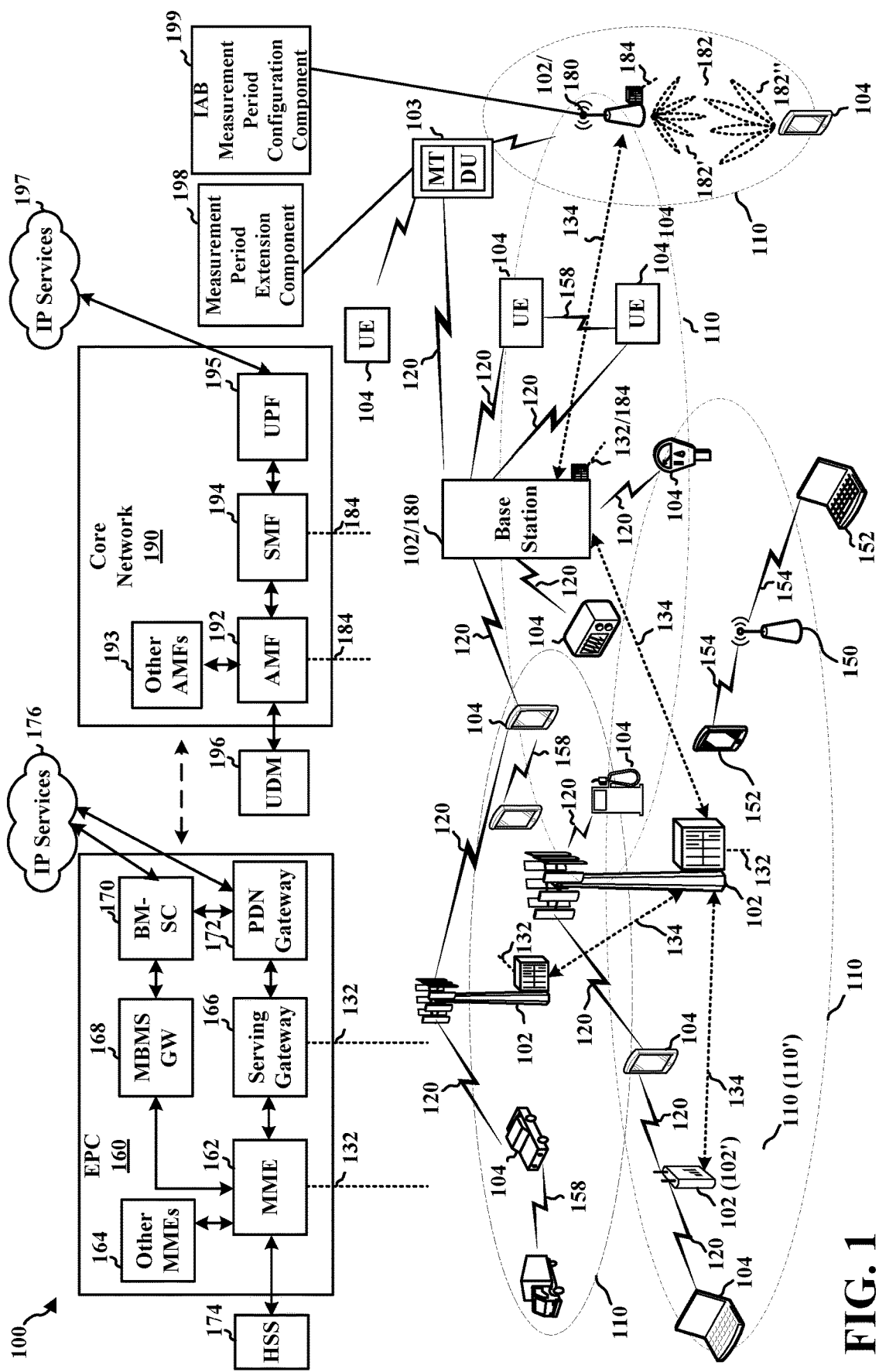
FIG. 1 is a diagram illustrating an example of a wireless communications system and an access network.

In some aspects of wireless communication, e.g., 5G NR, a network node (e.g., a user equipment (UE) or IAB node) may measure beam and cell level reference signals from a parent node within a certain period. In a half-duplex IAB network, an IAB-MT (e.g., an IAB-MT function of an IAB node) may need to skip measuring beam or cell level reference signals due to an overlap with communication of a co-located IAB-DU (e.g., an IAB-DU function of the IAB node). Aspects presented herein provide for the IAB node to extend a measurement period of the IAB-MT to address half-duplex operation of the IAB node and enable the IAB node to perform accurate measurements.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. The access network 100 may include one or more IAB nodes 103. The IAB nodes may exchange communication with other IAB nodes 103, with a base station 102 or 180, and/or with UEs 104.

Referring again to FIG. 1, in certain aspects, an IAB node 103 may include a measurement period extension component 198 configured to receive a configuration for a first set of reference signals associated with an IAB-MT function of the IAB node 103, where the first set of reference signals overlaps in time with a second set of time periods associated with an IAB-DU function of the IAB node 103. The measurement period extension component 198 may further be configured to extend an IAB-MT reference-signal measurement period based on the overlap between the first set of reference signals for measurement with the IAB-MT function of the IAB node 103 and the second set of time periods associated with the IAB-DU function of the IAB node 103. In certain aspects, the base station 102/180 may include an IAB measurement period configuration component 199 configured to configure an IAB node 103 for measurement of a first set of reference signals with an IAB-MT function of the IAB node 103. The IAB measurement period configuration component 199 may further be configured to configure the IAB node 103 with a scaling factor for extending an IAB-MT reference-signal measurement period based on an overlap between the first set of reference signals for measurement with the IAB-MT function of the IAB node 103 and a second set of time periods associated with the IAB-DU function of the IAB node 103. Although the following description may be focused on 5G NR, the concepts described herein may be applicable to other similar areas, such as LTE, LTE-A, CDMA, GSM, and other wireless technologies.

Figure 2:
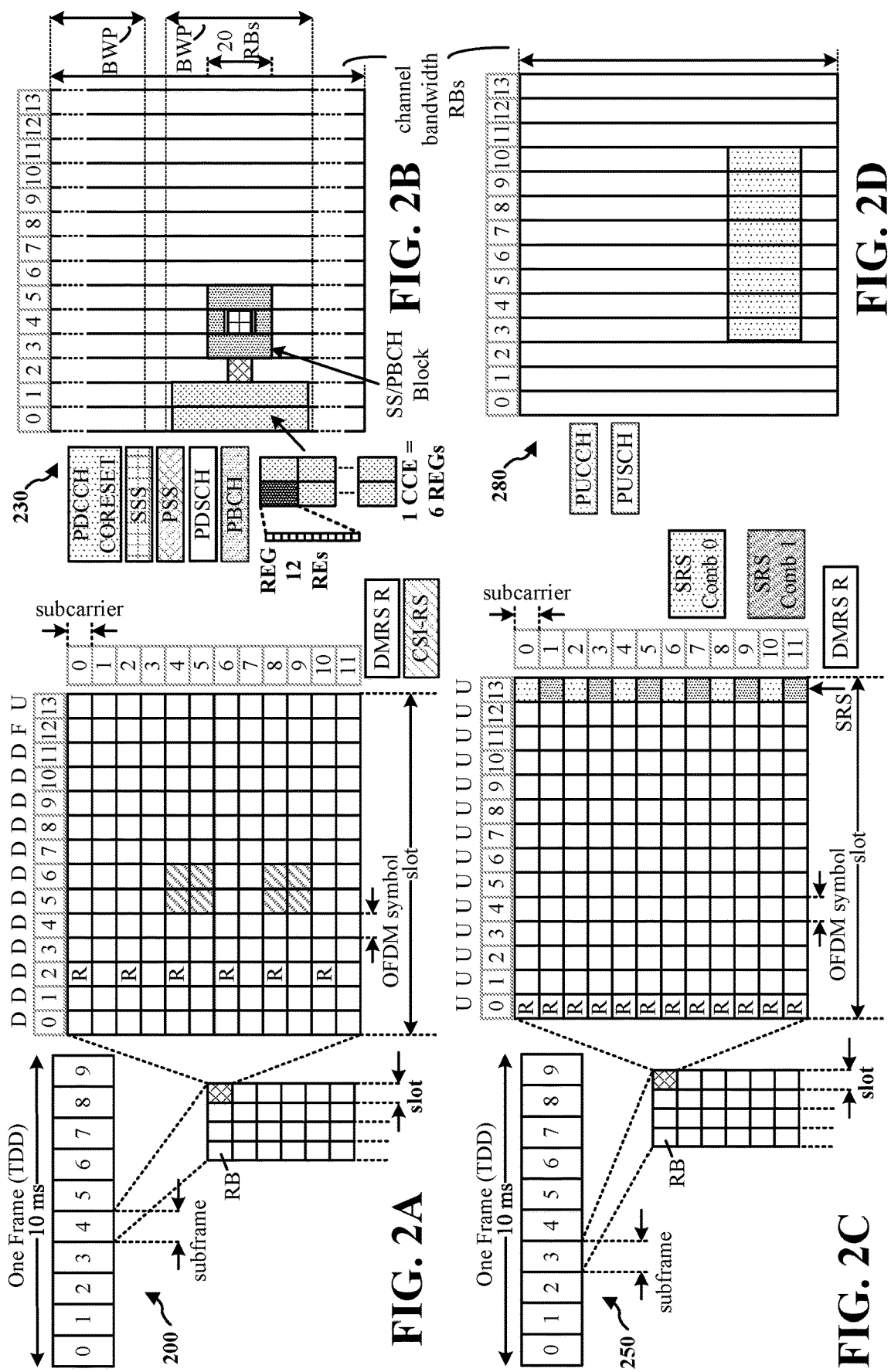
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |

-continued

| μ | SCS Δf = $2^\mu \cdot 15$[kHz] | Cyclic prefix |
|---|---|---|
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
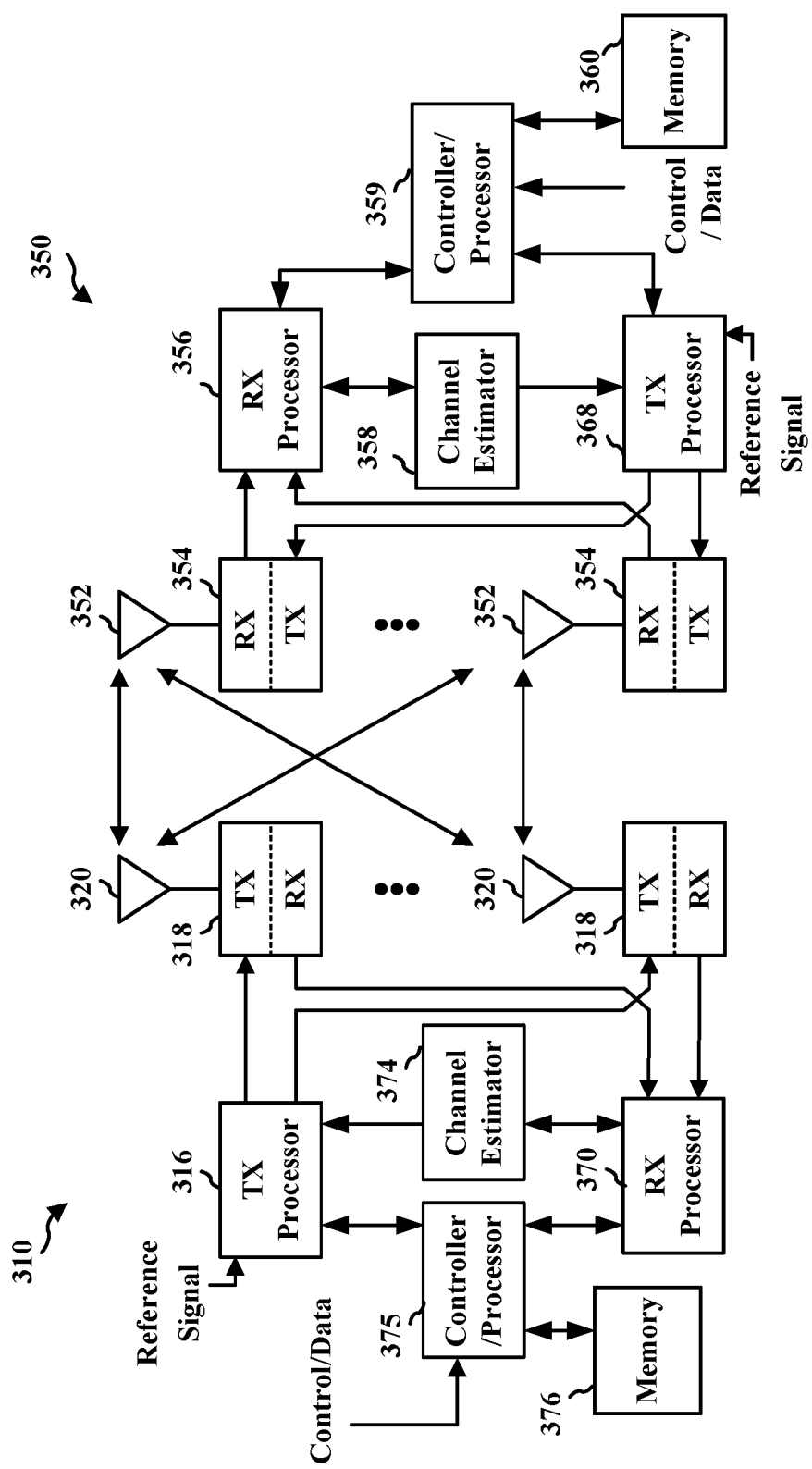
FIG. 3 is a diagram illustrating an example of a base station and user equipment (UE) in an access network.

FIG. 3 is a block diagram of an IAB node 310 in communication with a second wireless device 350 in an access network. The second wireless device may be any of a base station 102, 180; a UE 104, or another IAB node 103. In the DL, IP packets from the EPC 160 or core network 190 may be provided to a controller/processor 375. The controller/processor 375 implements layer 3 and/or layer 2 functionality. Layer 3 includes a radio resource control (RRC) layer, and may be performed if the IAB node is a donor IAB node. Layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the second wireless device 350. Each spatial stream may then be provided to a different antenna 320 via a separate transmitter 318TX. Each transmitter 318TX may modulate an RF carrier with a respective spatial stream for transmission.

At the second wireless device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the second wireless device 350. If multiple spatial streams are destined for the second wireless device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the IAB node 310. These soft decisions may be based on channel estimates computed by the channel estimator 358. The soft decisions are then decoded and deinterleaved to recover the data and control signals that were originally transmitted by the IAB node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the IAB node 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the IAB node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the IAB node 310 in a manner similar to that described in connection with the receiver function at the second wireless device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the second wireless device 350. IP packets from the controller/processor 375 may be provided to the EPC 160 or core network 190, e.g., via a donor IAB node if the IAB node is not a donor IAB node. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
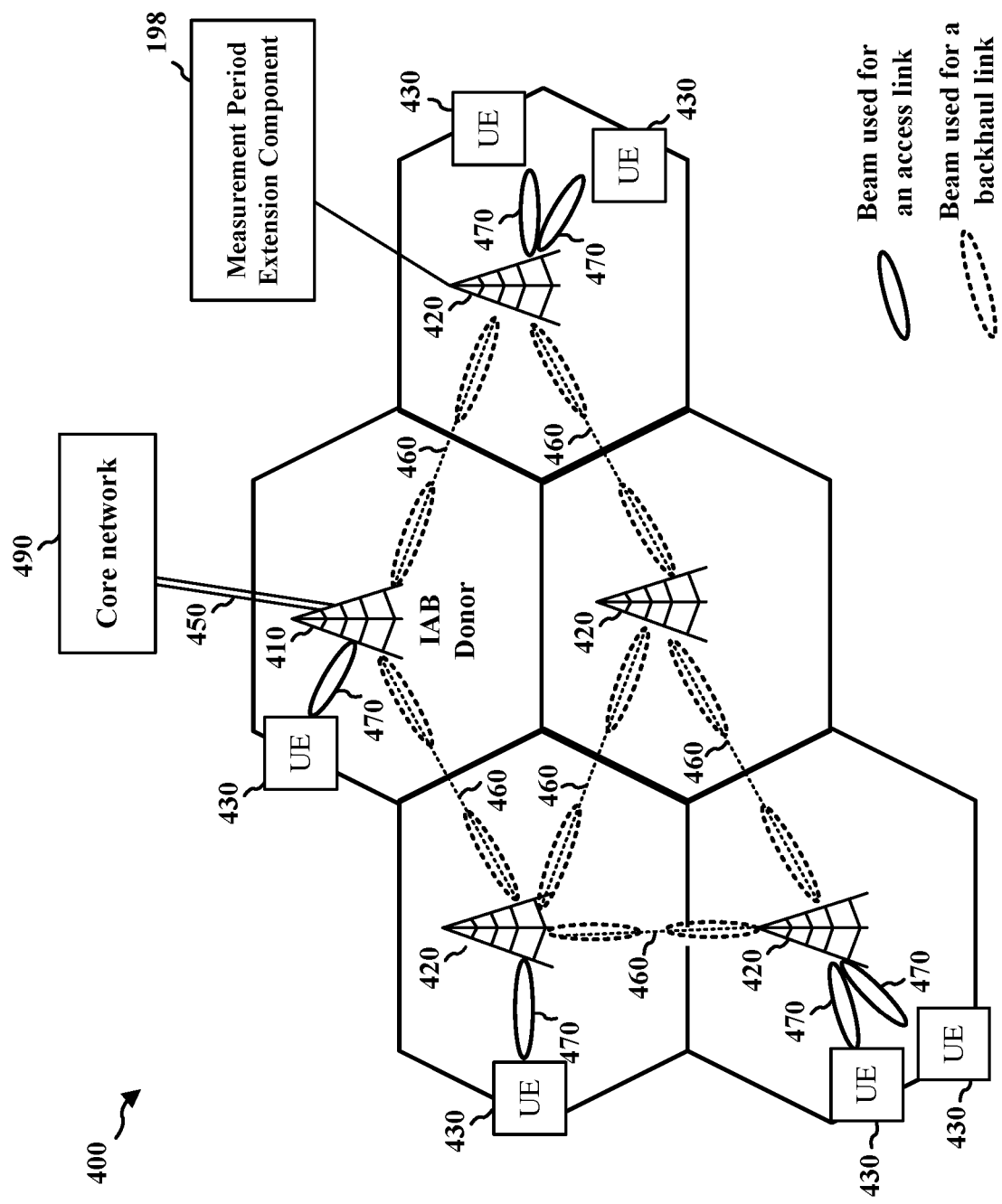
FIG. 4 is a diagram illustrating an example IAB network.

FIG. 4 is a diagram illustrating an IAB network 400. The IAB network provides access network functionality between access nodes (ANs) and other ANs/UEs, and backhaul network functionality between ANs. The ANs include IAB-donors, which have a wireline connection to the core network, and IAB-nodes, which operate wirelessly and relay traffic to/from IAB-donors through one or more AN hops. The IAB ANs share resources between the access and backhaul. That is, the resources used for access communication between the ANs and ANs/UEs are also used for backhaul communication between the ANs.

The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node.

Figure 5:
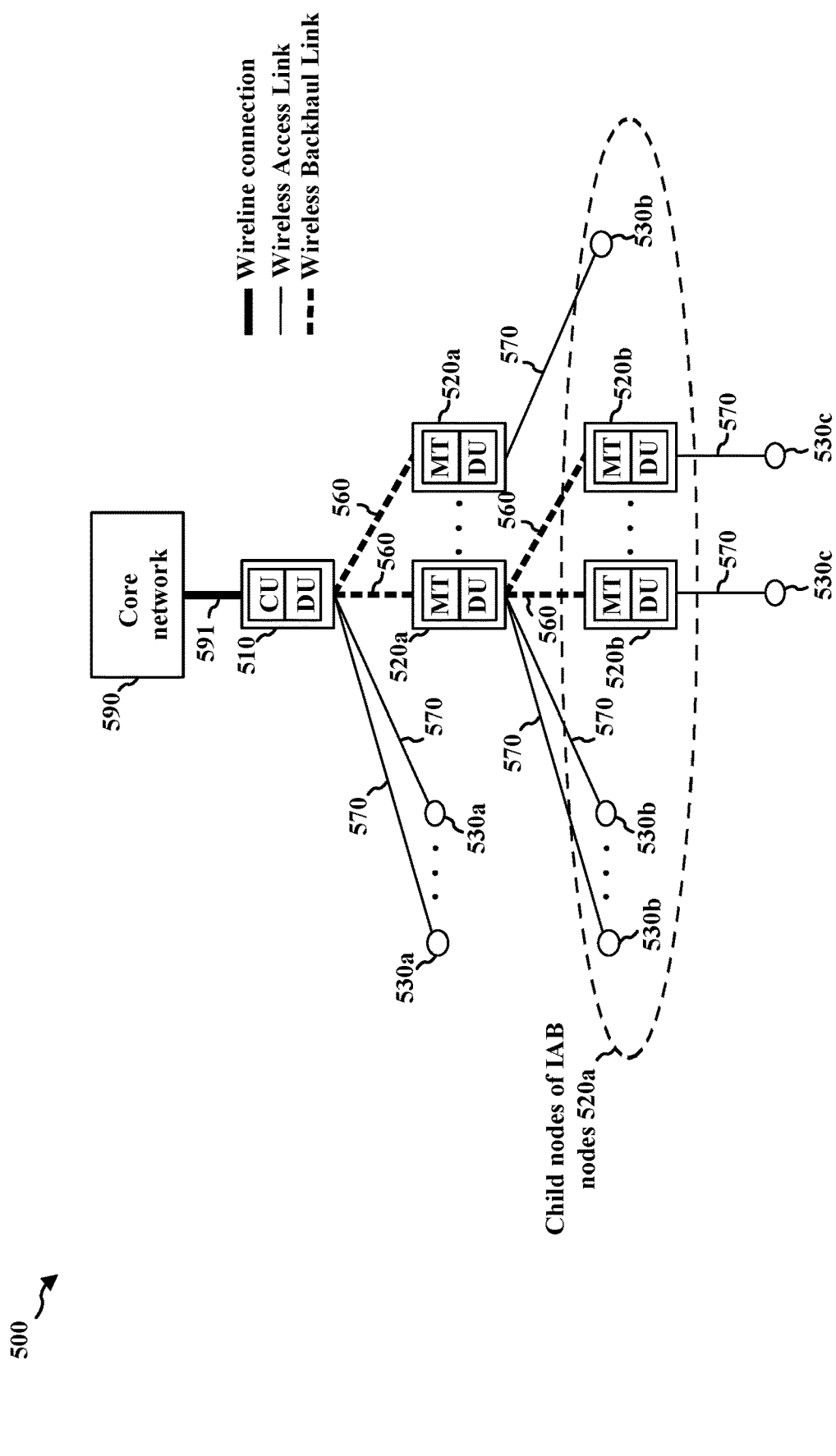
FIG. 5 is a diagram illustrating an example IAB network and components thereof.

FIG. 5 illustrates a second diagram illustrating an IAB network 500 and components thereof. The IAB network 500 includes an IAB donor 510 and IAB nodes 520. The IAB nodes, as well as the IAB donor, may provide wireless access links to UEs 530a-c.

The IAB donor 510 may be considered a root node of the tree structure of the TAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may control the IAB network 500 through configuration. The CU may perform RRC/PDCP layer functions. The IAB donors 510 further include a DU that performs scheduling. For example, the DU may schedule resources for communication by the child IAB nodes 520a and/or UEs 530a of the IAB donor 510. The DU holds radio link control (RLC), media access control (MAC), a physical (PHY) layer functions.

The IAB nodes 520a, 520b may include a mobile termination (MT) and a DU. The IAB node is an L2 relay node. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node. The pattern of a parent IAB node comprising a DU that schedules a child IAB node/child UE may continue to more connections that illustrated in FIG. 5.

Figure 6:
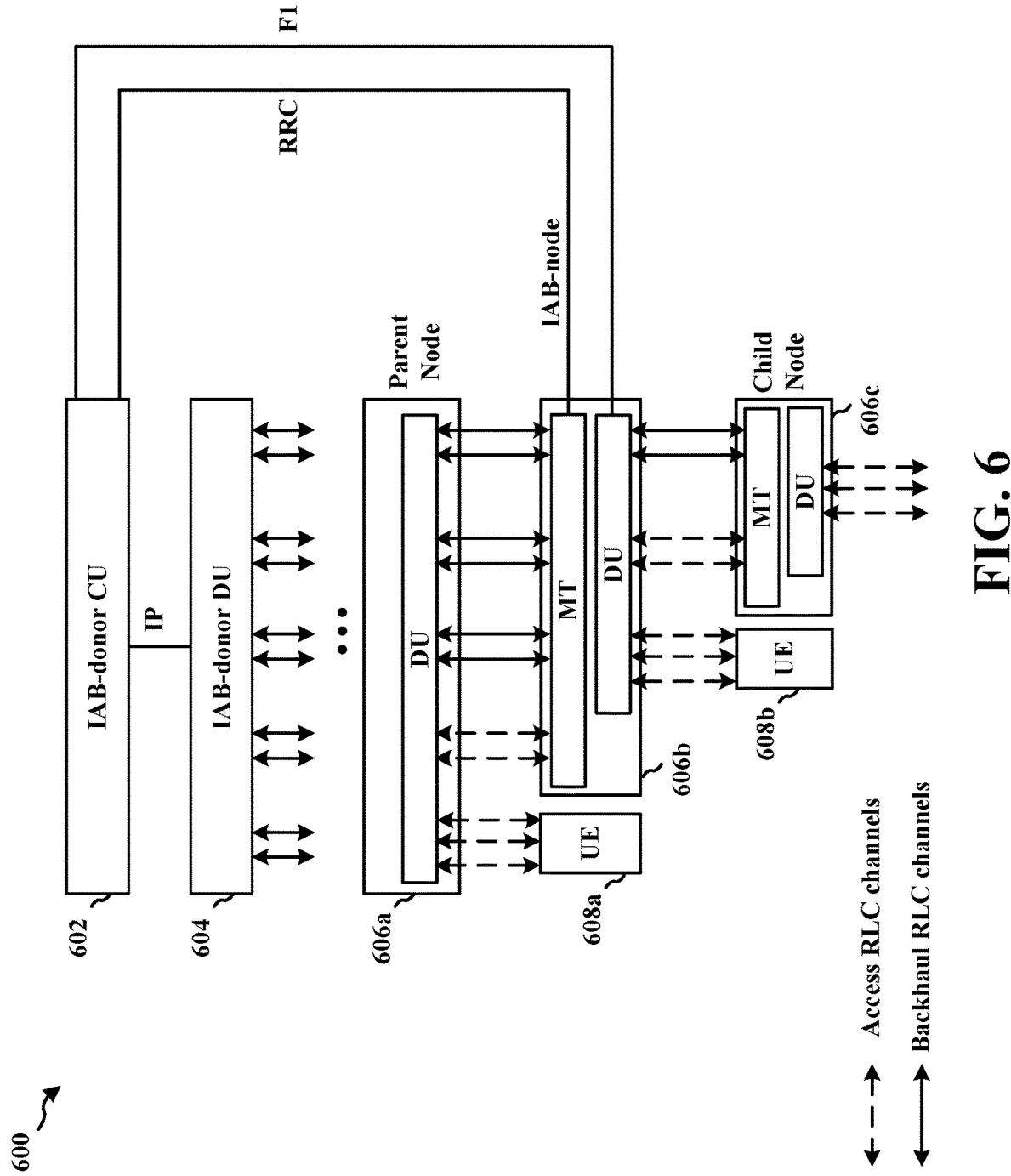
FIG. 6 is a diagram illustrating an example connections for an IAB network.

FIG. 6 is a diagram 600 illustrating RLC channels in an IAB network. As discussed in the present application, the IAB network provides both access network functionality and backhaul network functionality. The IAB network includes an IAB donor with a CU 602 and DU 604 Per the access network functionality, IAB ANs 606a, 606b, and 606c may communicate with other UEs 608a and 608b and/or MTs of other IAB ANs through access RLC channels. Per the backhaul network functionality, IAB ANs 606a, 606b, and 606c may route traffic to other ANs (e.g., 606a, 606b, and 606c) through backhaul RLC channels. Access RLC channels include UE-to-DU/DU-to-UE, carrying PDCP for RRC or data radio bearers (DRBs), and MT-to-DU/DU-to-MT, carrying PDCP for RRC (or DRBs). Backhaul RLC channels include MT-to-DU/DU-to-MT, carrying backhaul adaptation protocol (BAP) messages for backhauling access traffic.

In some aspects of wireless communication, e.g., 5G NR, a network node (e.g., a UE or IAB node) may be configured to measure beam and cell level reference signals from a parent node within a certain period. In a half-duplex IAB network, an IAB-MT (e.g., an IAB-MT function of an IAB node) may skip measuring beam or cell level reference signals if they overlap with communication of a co-located IAB-DU (e.g., an IAB-DU function of the IAB node). In such situations, it may be beneficial to extend a measurement period of the IAB-MT so that both the IAB-MT and IAB-DU can communicate smoothly.

The beam failure or candidate beam detection evaluation periods of IAB mobile termination (IAB-MT) units may be extended based on a combination of measurement gap and four SSB measurement timing configurations (SMTCs) of each frequency layer. For example, in some aspects, an IAB-MT may be able to evaluate whether a downlink radio link quality on the configured SSB resource in a set to estimated over a last $T_{Evaluate\_BFD\_SSB}$ ms period becomes worse than a threshold $Q_{out\_LR\_SSB}$ within a $T_{Evaluate\_BFD\_SSB}$ ms period. A scaling factor (P) may be calculated based on an SSB periodicity ($T_{SSB}$) and a SMTC period ($T_{SMTCPeriod}$). In some aspects, the scaling factor P may be for a particular frequency range, such as FR2. In some aspects, when a BFD-RS resource is not overlapped with a measurement gap and the BFD-RS resource is partially overlapped with an SMTC occasion ($T_{SSB}<T_{SMTCperiod}$) P may be defined by $$P = \frac{1}{1 - \frac{T_{SSB}}{T_{SMTCperiod}}}.$$

In some aspects, if the IAB-MT is not capable of four SMTC configurations per frequency, and the IAB-MT is provided with higher layer signaling of smtcj, where $1 \leq j \leq 2$, then $T_{SMTCperiod}$ may follows $smtcj_{max}$, where $j_{max}$ is the maximum value of all j for which smtcj has been configured. If the IAB-MT supports four SMTC configurations per frequency, and is provided with a higher layer signaling of smtcj, where $1 \leq j \leq 2$, then the $T_{SMTCperiod}$ may follow $smtcj_{max}$, where $j_{max}$ is the maximum value of all j for which smtcj has been configured.

Figure 7:
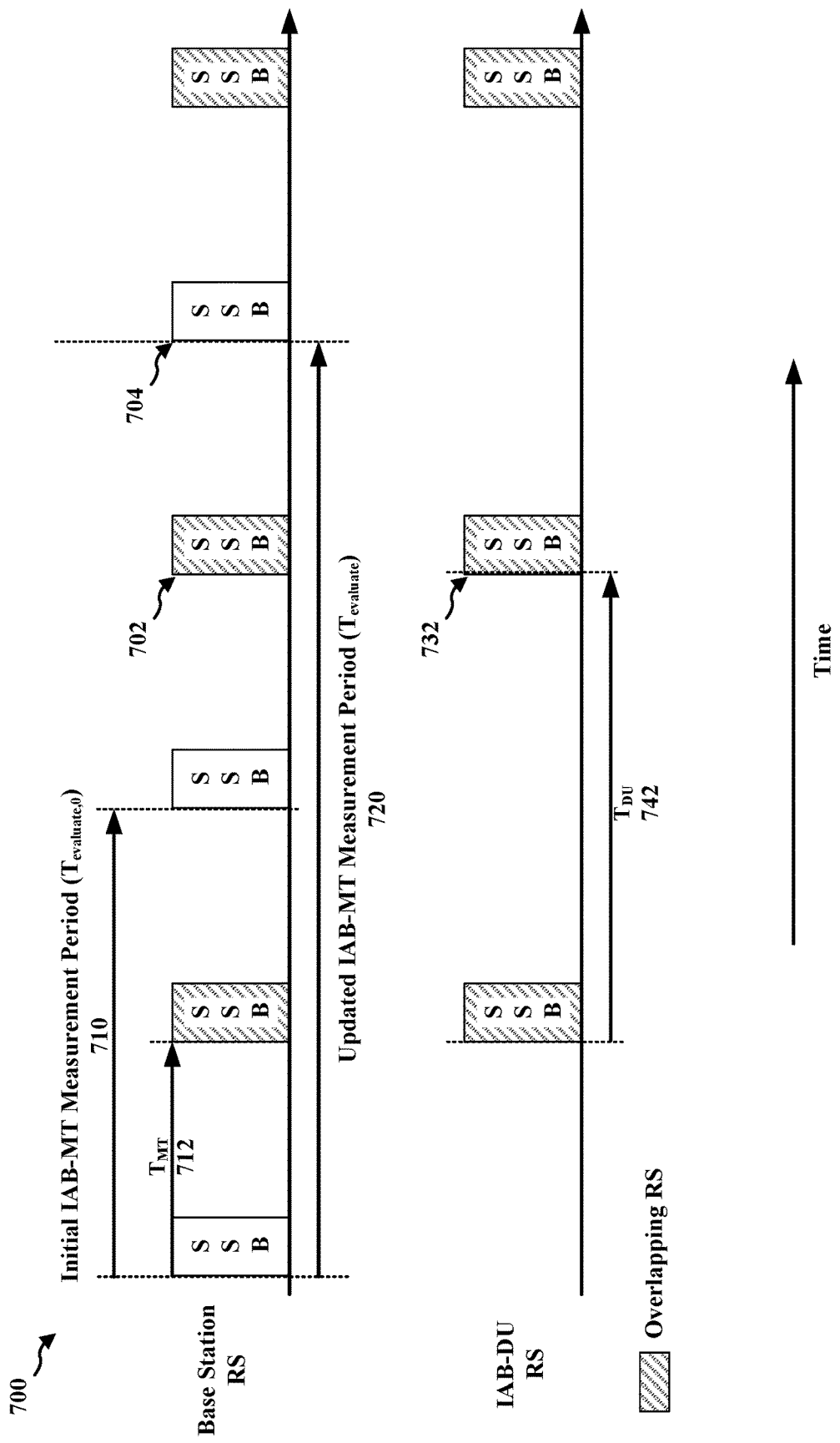
FIG. 7 is a diagram illustrating overlapping reference signals associated with an IAB-MT and a collocated IAB-DU.

FIG. 7 is a diagram 700 illustrating overlapping reference signals (e.g., SSBs 702 and 732) associated with an IAB-MT and a collocated IAB-DU. Diagram 700 illustrates that an IAB-MT may initially be configured to measure a set of reference signals (e.g., SSBs 702 and 704) with a periodicity, $T_{MT}$, 712 over a period, $T_{evaluate,0}$, 710 (e.g., a period in which the base station transmits a particular number of reference signals). In some aspects, the reference signals may be a CSI-RS, and the reference signals may be used for at least one of radio link monitoring (RLM), beam failure detection (BFD) candidate beam detection, new cell detection, intra-frequency cell re-selection, and inter-frequency cell re-selection. At least one reference signal associated with the base station and IAB-MT (e.g., SSB 702) may overlap with a reference signal associated with an IAB-DU (e.g., SSB 732). The reference signal associated with the IAB-DU may have a periodicity, $T_{DU}$, 742. In some aspects, the IAB-MT may not measure reference signals if the reference signals overlap in time with resources of the IAB-DU. For example, the IAB-MT may be configured for half-duplex communication, may be operating in a half-duplex mode, or may not support full-duplex operation. An updated IAB-MT measurement period, $T_{evaluate}$, 720, may be based on the relative periodicity (e.g., $T_{MT}$ 712 and Thu 742) of the reference signals associated with the IAB-MT and the reference signals associated with the IAB-DU. The updated IAB-MT measurement period, $T_{evaluate}$, 720, may be configured (e.g., determined or selected) such that the updated IAB-MT measurement period, $T_{evaluate}$, 720 spans a time interval including the particular number of non-overlapping reference signals that were included in the initial time period, $T_{evaluate,0}$, 710.

For example, in FIG. 7, every other SSB of the base station (e.g., parent gNB) associated with the IAB-MT overlaps with the SSB associated with the co-located IAB-DU. The particular overlap in FIG. 7 is merely to illustrate the concept, and the overlap may be based on a different pattern or a larger number of overlapping reference signals than illustrated in FIG. 7. Additionally, FIG. 7 illustrates that the IAB-MT measurement period, $T_{evaluate,0}$ 710 may initially be configured to measure the SSB transmitted by a base station (e.g., a parent gNB) via two samples (e.g., by measuring two SSB transmissions). Based on the overlap of the SSB transmitted by the base station with the SSB associated with the IAB-DU, FIG. 7 illustrates that the updated/expanded IAB-MT measurement period, P, of the reference signals may be extended to span four reference signals (e.g., SSB transmissions) in order to measure two non-overlapping samples (e.g., SSB 704).

Figure 8:
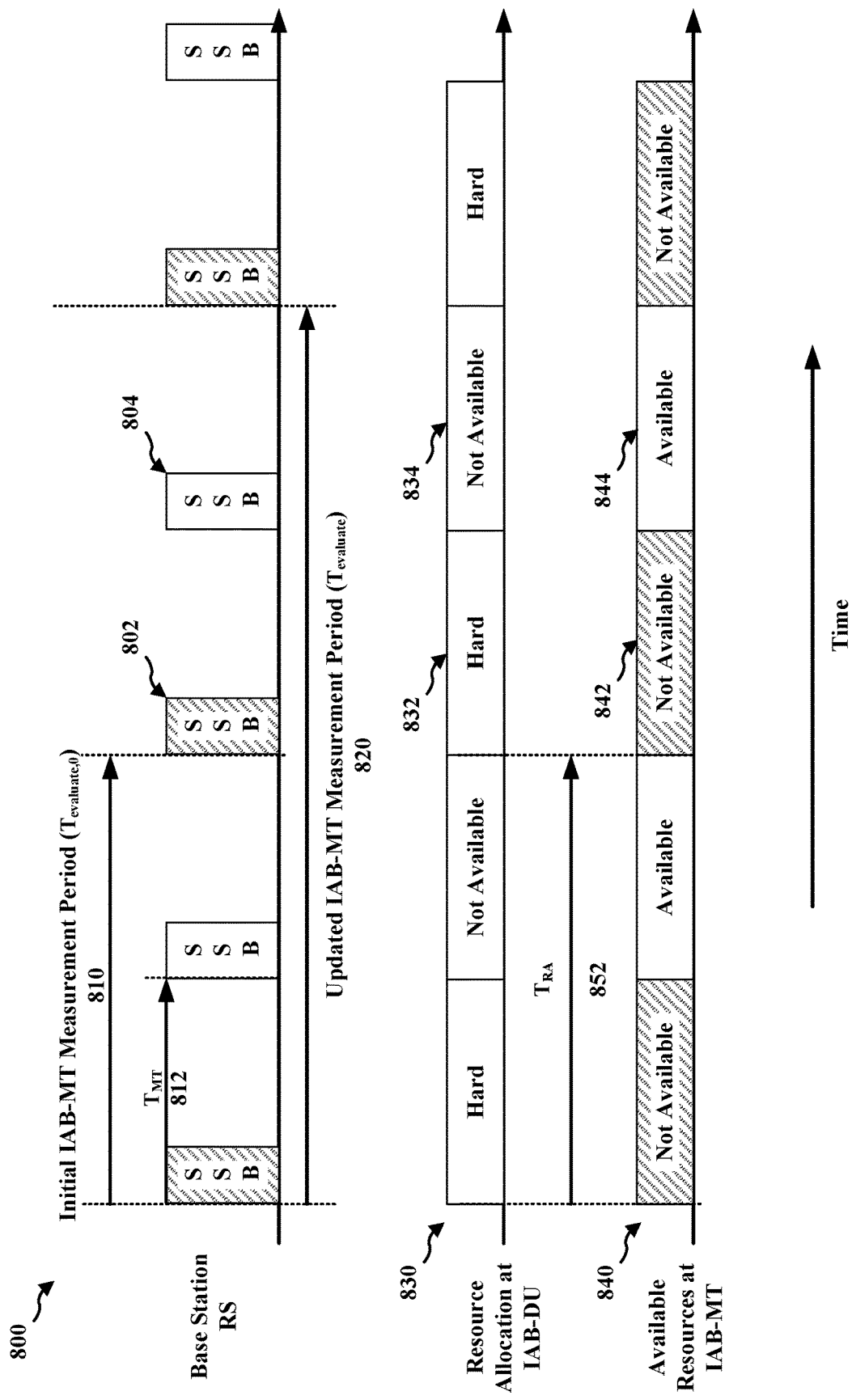
FIG. 8 is a diagram illustrating an allocation of resources to a co-located IAB-MT and IAB-DU that may preclude measurement of a reference signal (from a base station) at the IAB-MT.

FIG. 8 is a diagram 800 illustrating an allocation of resources to a co-located IAB-MT (diagram 840) and IAB-DU (diagram 830) that may preclude measurement of a reference signal (from a base station) at the IAB-MT. For example, IAB-DU may be configured with 'hard', 'soft', and 'not available' resources. An IAB-DU can schedule resources for its children flexibly in 'hard' resources but it cannot schedule resources in its 'not available' resources. In a half-duplex network, the available resources of IAB-MT are mirror images of the configured resources of the co-located IAB-DU. Accordingly, 'hard' configured resources are 'not available' for measurement at IAB-MT. 'Not available' resources of IAB-DU are 'available' for measurement at IAB-MT. Diagrams 830 and 840 illustrate an IAB-DU configured with alternating 'hard' resources 832 and 'not available' resources 834 and the corresponding allocation of 'not available' resources 842 and 'available' resources 844 at the IAB-MT.

As described above in relation to diagram 700 of FIG. 7, diagram 800 illustrates a reference signal (e.g., SSB 802) from a base station overlapping with a 'not available' resource 842 of an IAB-MT resource allocation of diagram 840. The 'not available' resource 842 of an IAB-MT resource allocation of diagram 840 may correspond to a 'hard' resource 832 of an IAB-DU resource allocation of diagram 830. Diagram 800 illustrates that an IAB-MT may initially be configured to measure a set of reference signals (e.g., SSBs 802 and 804) with a periodicity, $T_{MT}$, 812 over a period, $T_{evaluate,0}$, 810 (e.g., a period in which the base station transmits a particular number of reference signals). At least one reference signal associated with the base station and IAB-MT (e.g., SSB 802) may overlap with a 'hard' resource allocated to the IAB-DU (e.g., 'hard' resource 832). The resources associated with the IAB-DU and IAB-MT may be allocated with a periodicity, $T_{RA}$, 852 (e.g., 'hard' resources may be allocated every $T_{RA}$, 852 ms). An updated IAB-MT measurement period, $T_{evaluate}$, 820, may be based on the relative periodicity (e.g., $T_{MT}$ 812 and $T_{RA}$ 852) of the reference signals associated with the IAB-MT and the resources allocated to the IAB-DU. The updated IAB-MT measurement period, $T_{evaluate}$, 820, may be configured (e.g., determined or selected) such that the updated IAB-MT measurement period, $T_{evaluate}$, 820 spans a time interval including the particular number of non-overlapping reference signals that were included in the time period, $T_{evaluate,0}$, 810.

For example, in FIG. 8, every other SSB of the base station (e.g., parent gNB) associated with the IAB-MT overlaps with the 'hard' resources allocated to the co-located IAB-DU. Additionally, FIG. 8 illustrates that the IAB-MT measurement period, $T_{evaluate,0}$, 810 may initially be configured to measure the SSB transmitted by a base station (e.g., a parent gNB) via two samples (e.g., by measuring two SSB transmissions). Based on the overlap of the SSB transmitted by the base station with the 'hard' resources allocated to the co-located IAB-DU, FIG. 8 illustrates that the updated/extended IAB-MT measurement period, P, of the reference signals may be extended to span four reference signals (e.g., SSB transmissions) in order to measure two non-overlapping samples (e.g., SSB 804).

Figure 9:
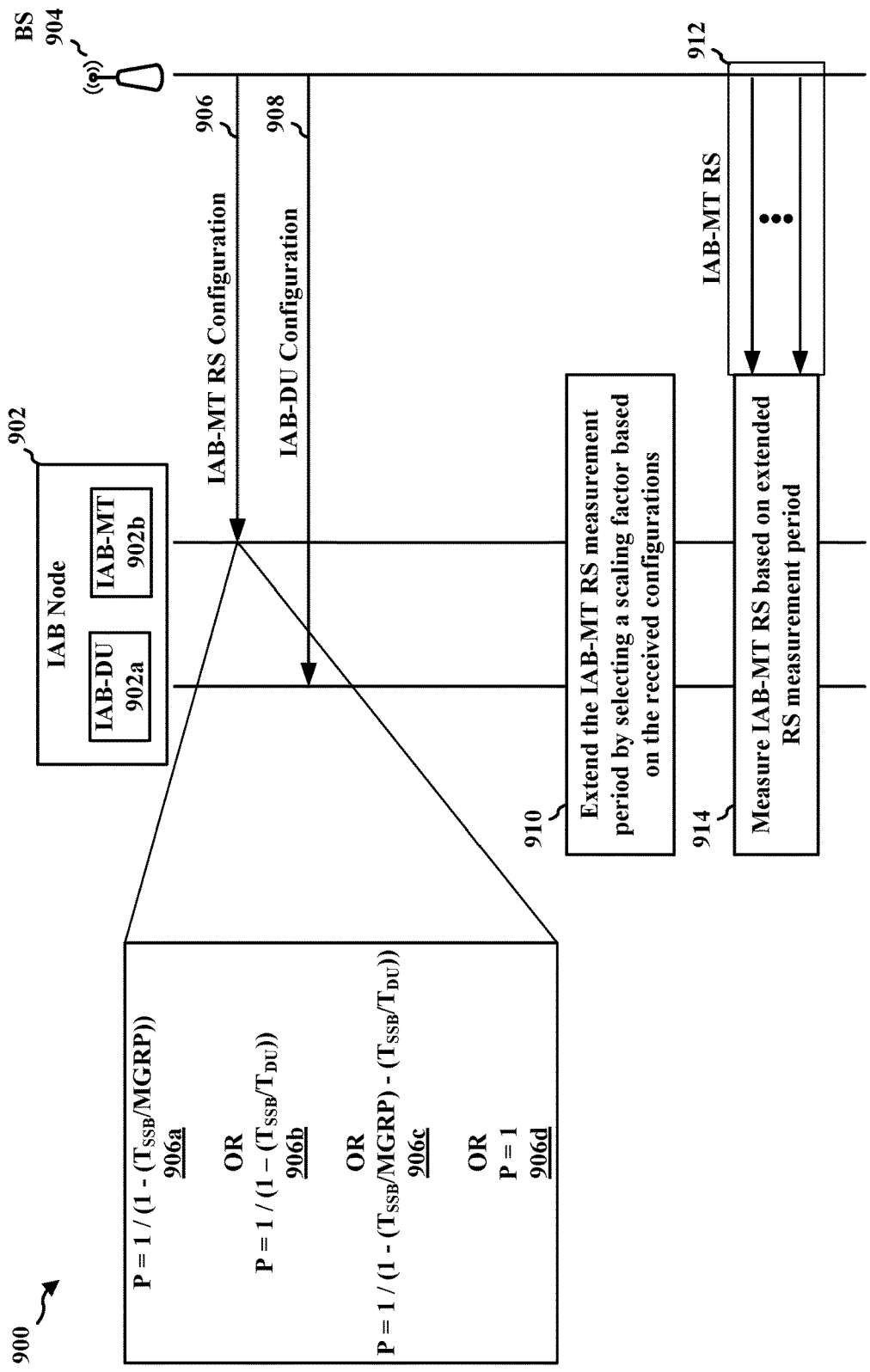
FIG. 9 is a call flow diagram illustrating an IAB node including an IAB-DU and an IAB-MT extending a measurement period based on a configuration received from a base station.

In some aspects, the extended measurement period may be defined in a technical specification or wireless communication standard. The definition in the technical specification may be defined in terms of (e.g., may depend on) a periodicity of IAB-MT resources (e.g., reference signals or resource allocations) a periodicity of IAB-DU resources (e.g., reference signals or resource allocations), a configured SSB measurement timing configuration (SMTC), and/or a measurement gap of the IAB-MT. FIG. 9 is a call flow diagram 900 illustrating an IAB node 902 including an IAB-DU 902a and an IAB-MT 902b extending a measurement period based on a configuration received from a base station 904.

Diagram 900 illustrates that a base station may transmit, and an IAB node 902 (e.g., an IAB-MT 902b) may receive, an IAB-MT RS configuration 906. The IAB-MT RS configuration 906 may include a configuration for reference signals from the base station 904 for measurement at the IAB-MT 902b. The IAB-MT configuration 906 may, in some aspects, include at least one of a radio link monitoring reference signal configuration, a beam failure detection reference signal configuration, a candidate beam detection reference signal configuration, an SMTC, or a measurement gap (MG) configuration (e.g., a measurement gap repetition period (MGRP)). In some aspects, the IAB-MT configuration 906 may also include an extended measurement period definition based on a periodicity of an SSB ($T_{SSB}$), an MGRP, a configured SMTC, and a periodicity ($T_{DU}$) of an IAB-DU reference signal (or allocated resource).

For example, for an IAB-MT measuring reference signals via a particular frequency range (e.g., FR1 or FR2), an out-of-sync (OOS) or an in-sync (IS) monitoring period of radio link monitoring (RLM) may be defined in IAB-MT RS configuration 906. In some aspects, a table (e.g., Table 1 below or a similar table) may be provided specifying an evaluation period for determining OOS or IS status. In some aspects multiple tables are provided with each table corresponding to a particular frequency range (e.g., a first table for FR1 and a second table for FR2). For example, Table 1 below or a similar table may be provided.

TABLE 1

| Configuration | $T_{Evaluate\_out\_SSB}$ (ms) | $T_{Evaluate\_in\_SSB}$ (ms) |
|---|---|---|
| no DRX | Max(200 × $K_1$, Ceil(10 × P × $K_1$) × $T_{SSB}$) | Max(100 × $K_1$, Ceil(5 × P × $K_1$) × $T_{SSB}$) |

NOTE:
$T_{SSB}$ is the periodicity of the SSB configured for RLM.

The IAB-MT RS configuration 906, in some aspects may further provide a definition for the term $K_1$ (e.g., for FR1, $K_1$ may equal 5) and a set of definitions for the scaling factor, P, based on the $T_{SSB}$, the MGRP, the configured SMTC, and the $T_{DU}$. In some aspects, different sets of definitions for the scaling factor, P, may be provided for different frequency ranges and/or for detecting different reference signals (e.g., radio link monitoring reference signals, beam failure detection reference signals, candidate beam detection reference signals, SMTC, and MGRP). For example, when, in the monitored cell (e.g., the IAB-MT 902b) there are measurement gaps configured for intra-frequency, inter-frequency or inter-RAT measurements, and these measurement gaps are overlapping with some but not all occasions of the SSB and when the periodic resources (e.g., reference signals) of the co-located IAB-DU do not overlap with the SSB occasions of the IAB-MT, P may be defined/calculated as $1/1-T_{SSB}/$MGRP as in element 906a of IAB-MT RS configuration 906. When, in the monitored cell (e.g., the IAB-MT 902b) there are no measurement gaps overlapping with any occasion of the SSB and the periodic resources (e.g., reference signals) of the co-located IAB-DU overlap with some but not all SSB occasions of the IAB-MT, P may be defined as $1/1-T_{SSB}/T_{DU}$ as in element 906b of IAB-MT RS configuration 906. P may be defined as $1/1-T_{SSB}/$MGRP$-T_{SSB}/T_{DU}$ as in element 906c of IAB-MT RS configuration 906, when in the monitored cell (e.g., the IAB-MT 902b) there are measurement gaps configured for intra-frequency, inter-frequency or inter-RAT measurements, and these measurement gaps are overlapping with some but not all occasions of the SSB and when the periodic resources of the co-located IAB-DU overlap with some but not all SSB occasions of the IAB-MT and the measurement gap resources do not overlap with the periodic resources of the co-located IAB-DU. Finally, P may be defined as "1" (e.g., no extension of the measurement time period is introduced by the scaling factor, P), as in element 906d of IAB-MT RS configuration 906, when in the monitored cell there are no measurement gaps overlapping with any occasion of the SSB and the periodic resources of the co-located IAB-DU do not overlap with the SSB occasions of the IAB-MT. In the examples above, $T_{DU}$ may denote the periodicity of the resources of IAB-DU that are unavailable for the IAB-MT. For example, these time resources may denote cell specific resources like SSB, RACH, system information, etc., at the IAB-DU. They may also refer to the resources that have been labelled as 'hard' resources to the IAB-DU. In some aspects, the resources associated with the IAB-DU are flexible resources (e.g., resources released to the IAB-DU by a parent node via DCI 2-5)

The base station 904 may transmit, and IAB node 902 (e.g., IAB-DU 902a) may receive, IAB-DU configuration 908. IAB-DU configuration 908 may include a resource allocation for IAB-DU resources (e.g., 'hard', 'soft', and 'not available' resources) and/or an indication of a reference signal configuration associated with the IAB-DU 902a. For example, the IAB-DU configuration 908 may include a value for a periodicity, $T_{DU}$, of a reference signal associated with IAB-DU 902a and/or a periodicity of a resource allocation, $T_{RA}$, associated with the IAB-DU 902a. The IAB-MT reference signal configuration 906 and the IAB-DU configuration 908 may be transmitted by the base station 904, and received by the IAB node 902, via at least one of an RRC message, a MAC-CE, or DCI.

Based on the received IAB-MT RS configuration 906 and the IAB-DU configuration 908, the IAB node 902 may extend 910 the IAB-MT measurement period by selecting (or calculating) a scaling factor. Extending 910 the IAB-MT (reference-signal) measurement period, in some aspects, includes scaling a baseline reference-signal measurement period with a scaling factor. In some aspects, the scaling factor is based on the overlap between the first set of reference signals associated with the IAB-MT function and the second set of time periods associated with the IAB-DU function. For example, based on a determination that a particular set of circumstances relating to conflicting resources described above exists, the IAB node 902 may determine a scaling factor, P, based on one of the configuration elements 906a to 906d, the IAB-MT reference signal configuration, the IAB-DU resource allocation (or reference signal configuration), and/or the MGRP.

The base station 904 may transmit, and the IAB node 902 (e.g., IAB-MT 902b) may receive, a set of IAB-MT reference signals 912. The IAB-MT 902b may measure 914 a set of the IAB-MT reference signals 912 over the extended measurement period (period 'P' of FIGS. 7 and 8). The measured 914 reference signals may be a subset of the IAB-MT reference signals 912 (e.g., based on an overlap between an IAB-MT reference signal and resources associated with a co-located IAB-DU).

Figure 10:
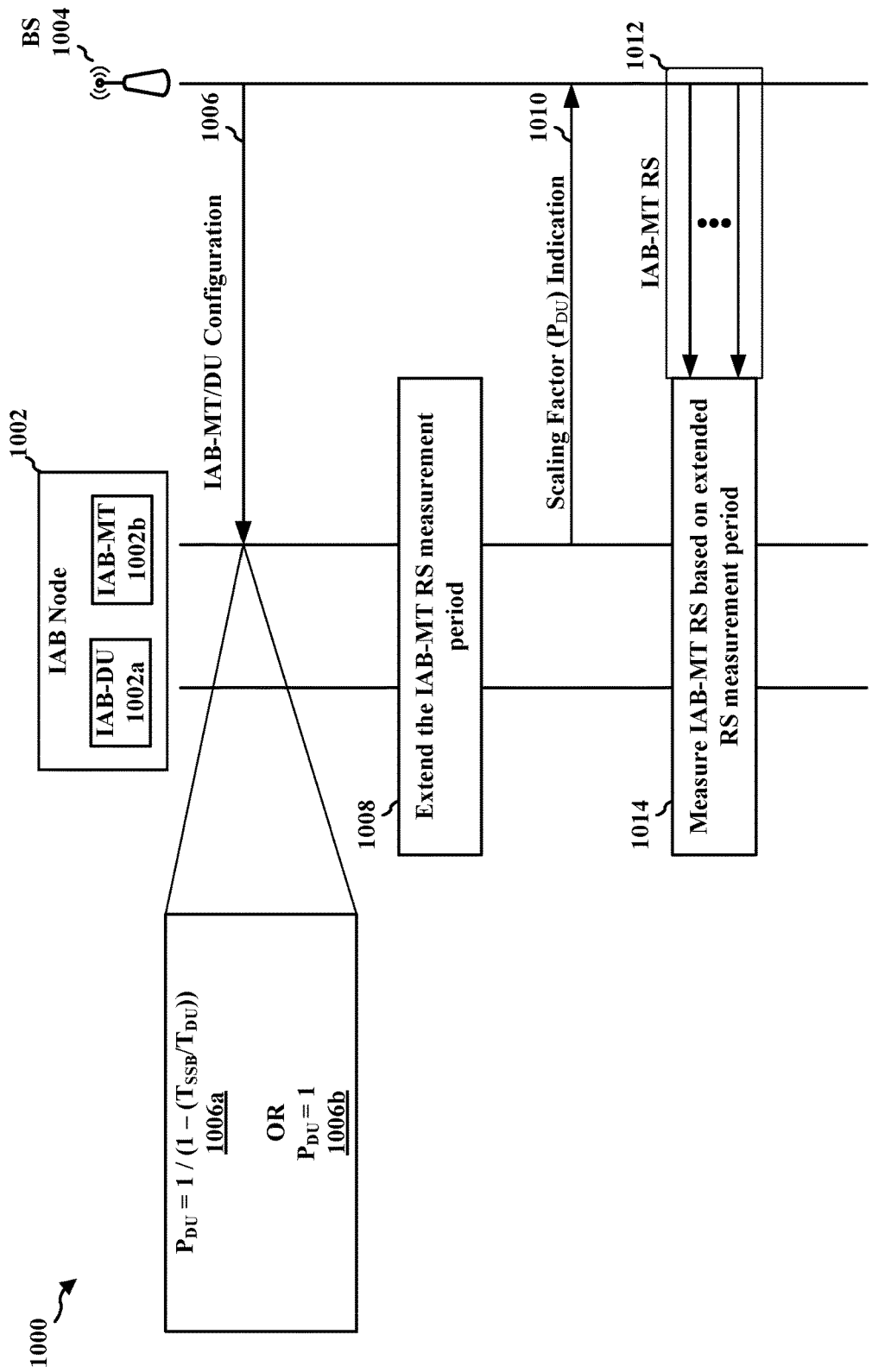
FIG. 10 is a call flow diagram illustrating an IAB node including an IAB-DU and an IAB-MT extending a measurement period based on a configuration received from a base station.

FIG. 10 is a call flow diagram 1000 illustrating an IAB node 1002 including an IAB-DU 1002a and an IAB-MT 1002b extending a measurement period based on a configuration received from a base station 1004. Diagram 1000 illustrates that a base station may transmit, and an IAB node 1002 (e.g., an IAB-MT 1002b) may receive, an IAB-MT/DU configuration 1006. The IAB-MT/DU configuration 1006 may include a configuration for reference signals from the base station 1004 for measurement at the IAB-MT 1002b. In some aspects, the IAB-MT/DU configuration 1006 may also include definitions for terms used in calculating (or determining) an extended measurement period (e.g., $T_{evaluate}$) or values (e.g., values for $T_{SSB}$, MGRP, and an SMTC, and/or $K_1$ and P) associated with a configuration of an extended measurement period. For example, the IAB-MT/DU configuration 1006 may include (1) a definition (or value) for a first scaling factor (P) based on a periodicity of an SSB ($T_{SSB}$) a measurement gap repetition period (MGRP), and an SMTC and (2) a definition of a second scaling factor ($P_{DU}$) based on a periodicity of the SSB ($T_{SSB}$) and a periodicity ($T_{DU}$) of an IAB-DU reference signal (or allocated resource). The IAB-MT/DU configuration 1006 may include one or more configuration messages including the configuration for the IAB-MT reference signals, the IAB-MT measurement period (e.g., extended measurement period) definition, the IAB-DU resource allocation, the IAB-DU reference signal configuration.

For example, for an IAB-MT measuring reference signals via a particular frequency range (e.g., FR1 or FR2), an OOS or IS monitoring period of RLM may be defined in IAB-MT/DU configuration 1006. In some aspects, a table (e.g., Table 2 below or a similar table) may be provided specifying an evaluation period for determining OOS or IS status. In some aspects multiple tables are provided with each table corresponding to a particular frequency range (e.g., a first table for FR1 and a second table for FR2). For example, Table 2 below or a similar table may be provided.

TABLE 2

| Configuration | $T_{Evaluate\_out\_SSB}$ (ms) | $T_{Evaluate\_in\_SSB}$ (ms) |
|---|---|---|
| no DRX | Max(200 × $K_1$, Ceil(10 × $P_{DU}$ × P × $K_1$) × $T_{SSB}$) | Max(100 × $K_1$, Ceil(5 × $P_{DU}$ × P × $K_1$) × $T_{SSB}$) |

NOTE:
$T_{SSB}$ is the periodicity of the SSB configured for RLM.

The IAB-MT/DU configuration 1006, in some aspects may further provide a definition for the term $K_1$ (e.g., for FR1, $K_1$ may equal 5) and a set of definitions for the scaling factors, P and $P_{DU}$, based on the $T_{SSB}$, the MGRP, the configured SMTC, and the $T_{DU}$. In some aspects, different sets of definitions for the scaling factor, P, may be provided for different frequency ranges and/or for detecting different reference signals (e.g., radio link monitoring reference signals, beam failure detection reference signals, candidate beam detection reference signals, SMTC, and MGRP). The first scaling factor (P) may be based on the $T_{SSB}$, the MGRP, and the configured SMTC, while the second scaling factor is based on the $T_{SSB}$ and the $T_{DU}$. For example, when, in the monitored cell (e.g., the IAB-MT 1002b) there are measurement gaps configured for intra-frequency, inter-frequency or inter-RAT measurements, and these measurement gaps are overlapping with some but not all occasions of the SSB, the first scaling factor (P) may be defined/calculated as $$\frac{1}{1 - \frac{T_{SSB}}{MGRP}}.$$

The second scaling factor ($P_{DU}$) may be defined/calculated as $$\frac{1}{1 - \frac{T_{SSB}}{T_{DU}}}$$

when the periodic resources (e.g., reference signals) of the co-located IAB-DU overlap with some but not all SSB occasions of the IAB-MT (e.g., configuration element 1006a). Accordingly, the extended measurement period may be extended by a scaling factor P×$P_{DU}$, with P and $P_{DU}$ being independently calculated/determined based on (1) the overlapping of the IAB-MT reference signals and a MGRP and (2) the overlapping of the IAB-MT reference signals and the resources associated with the IAB-DU, respectively.

Finally, P may be defined as "1" (e.g., no extension of the measurement time period is introduced by the first scaling factor, P), when in the monitored cell there are no measurement gaps overlapping with any occasion of the SSB, and $P_{DU}$ may be defined as "1" (e.g., no extension of the measurement time period is introduced by the second scaling factor, $P_{DU}$), when in the monitored cell the periodic resources of the co-located IAB-DU do not overlap with the SSB occasions of the IAB-MT (e.g., configuration element 1006b). In the examples above, $T_{DU}$ may denote the periodicity of the resources of IAB-DU that are unavailable for the IAB-MT. For example, these time resources may denote cell specific resources like SSB, RACH, system information, paging, etc., at the IAB-DU. They may also refer to the resources that have been labelled as 'hard' resources to the IAB-DU. In some aspects, the overlapping resources are associated with guard symbols at the IAB node that are used to switch between IAB-MT and IAB-DU (e.g., that separate resources associated with the IAB-MT function and resources associated with the IAB-DU function).

The IAB-MT/DU configuration 1006 may include a resource allocation for IAB-DU resources (e.g., 'hard', 'soft', and 'not available' resources) and/or an indication of a reference signal configuration associated with the IAB-DU 1002a. For example, the IAB-MT/DU configuration 1006 may include a value for a periodicity, Too, of a reference signal associated with IAB-DU 1002a and/or a periodicity of a resource allocation, $T_{RA}$, associated with the IAB-DU 1002a. The IAB-MT/DU configuration 1006 may be transmitted by the base station 1004, and received by the IAB node 1002, via at least one of an RRC message, a MAC-CE, or DCI.

Based on the IAB-MT/DU configuration 1006, the IAB node 1002 may extend 1008 the IAB-MT measurement period by selecting (or calculating) a scaling factor (e.g., the second scaling factor $P_{DU}$). For example, based on a determination that a particular set of circumstances relating to conflicting resources of an IAB-MT and an IAB-DU described above exists, the IAB node 1002 may determine a scaling factor, $P_{DU}$, based on one of the configuration elements 1006a or 1006b (e.g., the scaling factor may be based on the IAB-MT reference signal periodicity ($T_{SSB}$) and the IAB-DU resource allocation (or reference signal) periodicity (Tau). In some aspects, the IAB node 1002 may also determine a scaling factor, P, based on the IAB-MT reference signal periodicity ($T_{SSB}$), the SMTC, and/or the MGRP when there is overlap between another resource, e.g., a measurement gap, with some but not all occasions of the SSB.

The IAB node 1002 (e.g., IAB-MT 1002b) may transmit, and the base station 1004 may receive, a scaling factor ($P_{DU}$) indication 1010. The scaling factor (Poo) indication 1010 may be transmitted via at least one of a PUSCH or a PUCCH. The IAB-MT 1002b may measure 1014 a set of the IAB-MT reference signals 1012 over the extended measurement period (period '$T_{evaluate}$' of FIGS. 7 and 8). The measured 1014 reference signals may be a subset of the IAB-MT reference signals 1012 (e.g., based on an overlap between an IAB-MT reference signal and resources associated with a co-located IAB-DU). In some aspects, the scaling factor ($P_{DU}$) indication 1010 may be transmitted by the IAB node 1002 before, or in conjunction with (e.g., as part of), extending 1008 the IAB-MT reference signal measurement period.

Figure 11:
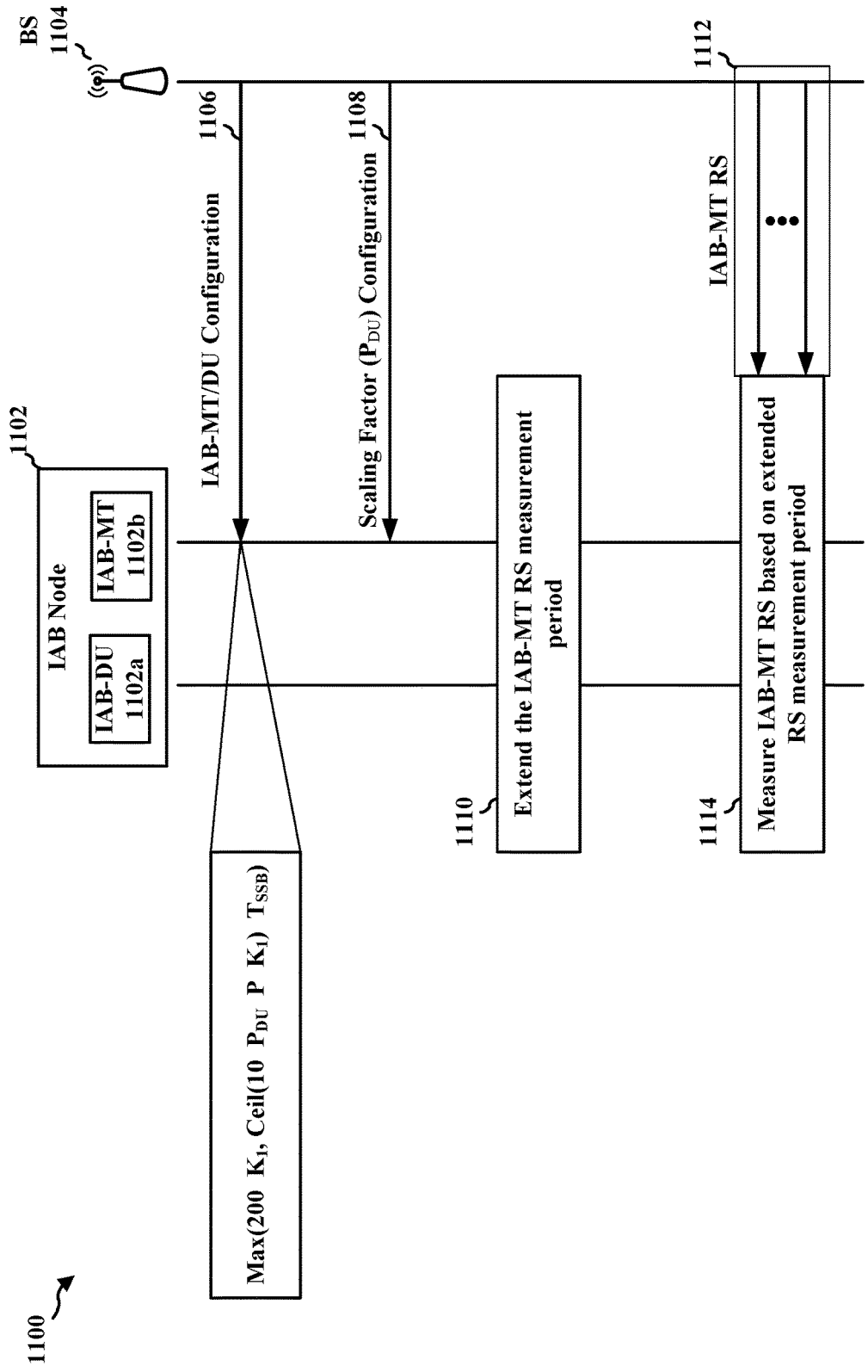
FIG. 11 is a call flow diagram illustrating an IAB node including an IAB-DU and an IAB-MT extending a measurement period based on a configuration received from a base station.

FIG. 11 is a call flow diagram 1100 illustrating an IAB node 1102 including an IAB-DU 1102a and an IAB-MT 1102b extending a measurement period based on a configuration received from a base station 1104. Diagram 1100 illustrates that a base station may transmit, and an IAB node 1102 (e.g., an IAB-MT 1102b) may receive, an IAB-MT/DU configuration 1106. The IAB-MT/DU configuration 1106 may include a configuration for reference signals from the base station 1104 for measurement at the IAB-MT 1102b. In some aspects, the IAB-MT/DU configuration 1106 may also include definitions for terms used in calculating (or determining) an extended measurement period (e.g., $T_{evaluate}$) or values (e.g., values for $T_{SSB}$, MGRP, and an SMTC, and/or $K_1$ and P) associated with a configuration of an extended measurement period. For example, the IAB-MT/DU configuration 1106 may include (1) a definition for a first scaling factor (P) based on a periodicity of an SSB ($T_{SSB}$) a measurement gap repetition period (MGRP), and an SMTC and (2) a definition for an extended measurement period (e.g., $T_{evaluate}$) based on the first scaling factor (P) and a second scaling factor ($P_{DU}$).

For example, for an IAB-MT measuring reference signals via a particular frequency range (e.g., FR1 or FR2), an OOS or IS monitoring period of RLM may be defined in IAB-MT/DU configuration 1106. In some aspects, a table (e.g., Table 2 above or a similar table) may be provided specifying an evaluation period for determining OOS or IS status. In some aspects multiple tables are provided with each table corresponding to a particular frequency range (e.g., a first table for FR1 and a second table for FR2). The IAB-MT/DU configuration 1106, in some aspects may further provide a definition for the term $K_1$ (e.g., for FR1, $K_1$ may equal 5) and a set of definitions for the scaling factor, P, based on the $T_{SSB}$, the MGRP, and the configured SMTC. For example, when, in the monitored cell (e.g., the IAB-MT 1102b) there are measurement gaps configured for intra-frequency, inter-frequency or inter-RAT measurements, and these measurement gaps are overlapping with some but not all occasions of the SSB, the first scaling factor (P) may be defined/calculated as $$\frac{1}{1 - \frac{T_{SSB}}{MGRP}}.$$

In some aspects, different sets of definitions for the scaling factor, P, may be provided for different frequency ranges and/or for detecting different reference signals (e.g., radio link monitoring reference signals, beam failure detection reference signals, candidate beam detection reference signals, SMTC, and MGRP).

The base station 1104 may also transmit, and the IAB node 1102 (e.g., an IAB-MT 1102b) may receive, a second scaling factor ($P_{DU}$) configuration 1108 used to calculate the extended measurement period (e.g., $T_{evaluate}$). The second scaling factor ($P_{DU}$) may be calculated by the base station as $$\frac{1}{1-\frac{T_{SSB}}{T_{DU}}}$$

when the periodic resources (e.g., reference signals) of the co-located IAB-DU overlap with some but not all SSB occasions of the IAB-MT (e.g., configuration element 1106a), or $P_{DU}$ may be defined as "1" (e.g., no extension of the measurement time period is introduced by the second scaling factor, $P_{DU}$), when in the monitored cell the periodic resources of the co-located IAB-DU do not overlap with the SSB occasions of the IAB-MT. Accordingly, the extended measurement period may be extended by a scaling factor P×$P_{DU}$, with P being calculated by either the IAB node 1102 or by the base station 1104 and $P_{DU}$ being provided by the base station 1104 based on the overlapping of the IAB-MT reference signals and the resources associated with the IAB-DU, respectively. In the examples above, $T_{DU}$ may denote the periodicity of the resources of IAB-DU that are unavailable for the IAB-MT. For example, these time resources may denote cell specific resources like SSB, RACH, system information, etc., at the IAB-DU. They may also refer to the resources that have been labelled as 'hard' resources to the IAB-DU.

The IAB-MT/DU configuration 1106 may include a resource allocation for IAB-DU resources (e.g., 'hard', 'soft', and 'not available' resources) and/or an indication of a reference signal configuration associated with the IAB-DU 1102a. For example, the IAB-MT/DU configuration 1106 may include a value for a periodicity, $T_{DU}$, of a reference signal associated with IAB-DU 1102a and/or a periodicity of a resource allocation, $T_{RA}$, associated with the IAB-DU 1102a. Based on the IAB-MT/DU configuration 1106 and the scaling factor ($P_{DU}$) configuration 1108, the IAB node 1102 may extend 1110 the IAB-MT measurement period by calculating a composite scaling factor (e.g., P×$P_{DU}$). For example, based on conflicting resources of an IAB-MT and an MGRP and/or an SMTC as described above, the IAB node 1102 may determine a scaling factor, P, (e.g., as described above in relation to FIG. 10). The determined first scaling factor (P) may then be multiplied by the second scaling factor ($P_{DU}$) received in scaling factor ($P_{DU}$) configuration 1108 to determine a composite scaling factor. In some aspects, the separate scaling factors P and $P_{DU}$ are used to calculate an expression for the extended measurement period as described in Table 2 above (e.g., Max(200× $K_1$, Ceil(10× $P_{DU}$×P×$K_1$)×$T_{SSB}$)). In some aspects, the composite scaling factor may be used in an expression (or definition) of an extended measurement period ($T_{evaluate}$) similar to the expression(s) found in Table 2. While a single value for an extended measurement period ($T_{evaluate}$) is referred to above in relation to FIGS. 7-12, it should be understood to refer to either an extended measurement period for an OOS monitoring period of RLM ($T_{Evaluate\_out\_SSB}$) or an extended measurement period for IS monitoring period of RLM ($T_{Evaluate\_in\_SSB}$).

The IAB-MT 1102b may measure 1114 a set of the IAB-MT reference signals 1112 over the extended measurement period (period '$T_{evaluate}$' of FIGS. 7 and 8). The measured 1114 reference signals may be a subset of the IAB-MT reference signals 1112. For example, the subset may include those IAB-MT reference signals that do not overlap with resources or reference signals associated with a co-located IAB-DU (e.g., IAB-DU 1102a).

Figure 12:
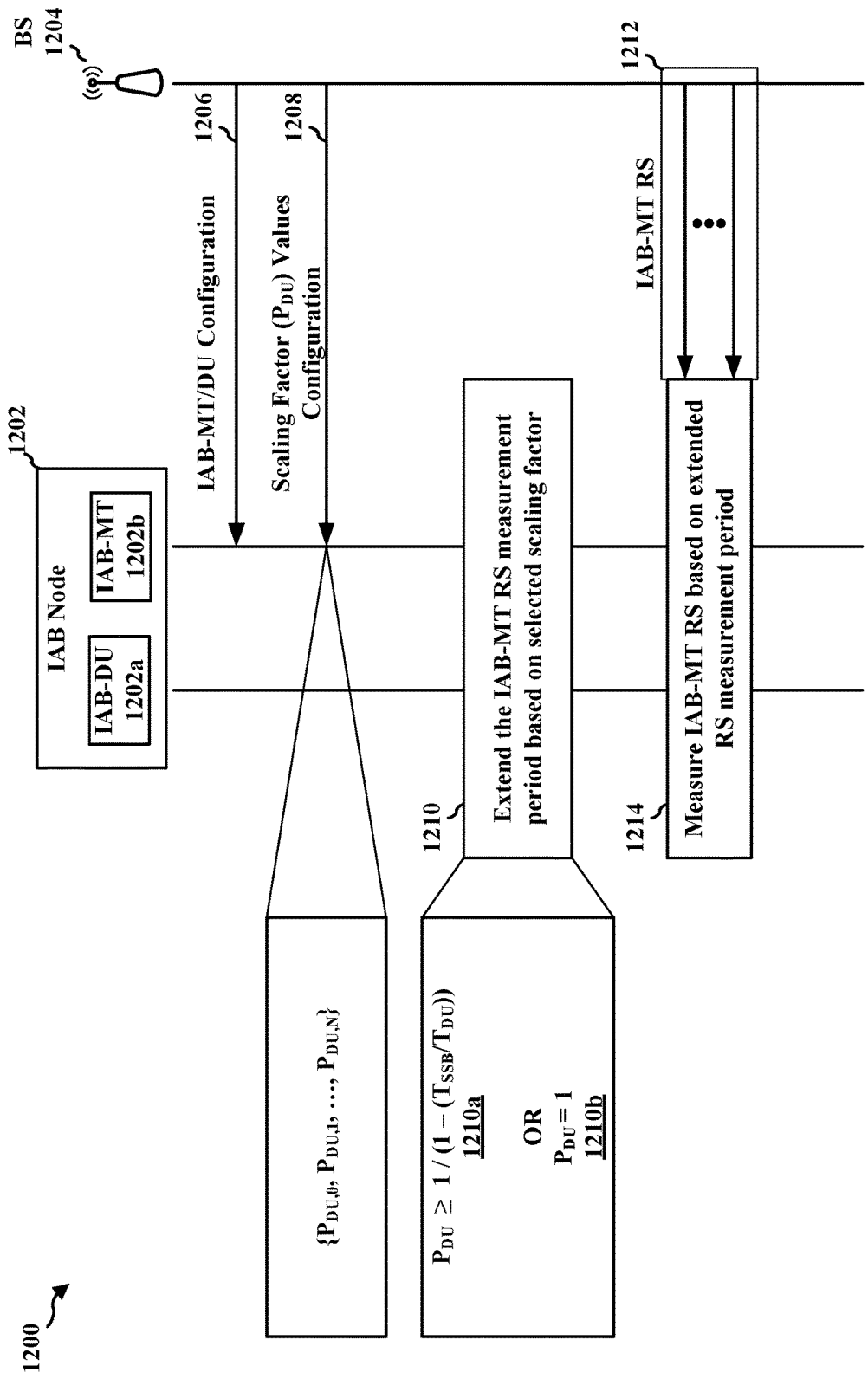
FIG. 12 is a call flow diagram illustrating an IAB node including an IAB-DU and an IAB-MT extending a measurement period based on a configuration received from a base station.

FIG. 12 is a call flow diagram 1200 illustrating an IAB node 1202 including an IAB-DU 1202a and an IAB-MT 1202b extending a measurement period based on a configuration received from a base station 1204. Diagram 1200 illustrates that a base station may transmit, and an IAB node 1202 (e.g., an IAB-MT 1202b) may receive, an IAB-MT/DU configuration 1206. The IAB-MT/DU configuration 1206 may include a configuration for reference signals from the base station 1204 for measurement at the IAB-MT 1202b. In some aspects, the IAB-MT/DU configuration 1206 may also include definitions for terms used in calculating (or determining) an extended measurement period (e.g., $T_{evaluate}$) or values (e.g., values for $T_{SSB}$, MGRP, and an SMTC, and/or $K_1$ and P) associated with a configuration of an extended measurement period. For example, the IAB-MT/DU configuration 1206 may include (1) a definition for a first scaling factor (P) based on a periodicity of an SSB ($T_{SSB}$) a measurement gap repetition period (MGRP), and an SMTC and (2) a definition for an extended measurement period (e.g., $T_{evaluate}$) based on the first scaling factor (P) and a second scaling factor ($P_{DU}$).

For example, for an IAB-MT measuring reference signals via a particular frequency range (e.g., FR1 or FR2), an OOS or IS monitoring period of RLM may be defined in IAB-MT/DU configuration 1206. In some aspects, a table (e.g., Table 2 above or a similar table) may be provided specifying an evaluation period for determining OOS or IS status. In some aspects multiple tables are provided with each table corresponding to a particular frequency range (e.g., a first table for FR1 and a second table for FR2). The IAB-MT/DU configuration 1206, in some aspects may further provide a definition for the term $K_1$ (e.g., for FR1, $K_1$ may equal 5) and a set of definitions for the scaling factor, P, based on the $T_{SSB}$, the MGRP, and the configured SMTC. For example, when, in the monitored cell (e.g., the IAB-MT 1202b) there are measurement gaps configured for intra-frequency, inter-frequency or inter-RAT measurements, and these measurement gaps are overlapping with some but not all occasions of the SSB, the first scaling factor (P) may be defined/calculated as $$\frac{1}{1-\frac{T_{SSB}}{MGRP}}.$$

In some aspects, different sets of definitions for the scaling factor, P, may be provided for different frequency ranges and/or for detecting different reference signals (e.g., radio link monitoring reference signals, beam failure detection reference signals, candidate beam detection reference signals, SMTC, and MGRP). For example, the first scaling factor (P) may be defined/calculated as $$\frac{1}{1-\frac{T_{SSB}}{MGRP}}$$

for a first frequency range while for a second frequency range the first scaling factor (P) may be defined/calculated as $$\frac{1}{1-\frac{T_{SSB}}{T_{SMTCperiod}}}.$$

The base station 1204 may also transmit, and the IAB node 1202 (e.g., an IAB-MT 1202b) may receive, a second scaling factor ($P_{DU}$) values configuration 1208 used to determine the second scaling factor ($P_{DU}$) and to calculate the extended measurement period (e.g., $T_{evaluate}$). The scaling factor ($P_{DU}$) values configuration 1208 may include a set of possible (or candidate) values for the second scaling factor ($P_{DU}$). In some aspects, the set of possible values may include an ordered and/or indexed list and a particular value may be selected based on the values for the periodicity ($T_{SSB}$) of the reference signals associated with the IAB-MT and the periodicity ($T_{DU}$) of the resources or reference signals associated with the IAB-DU. For example, the second scaling factor ($P_{DU}$) may be calculated based on the expression $$\frac{1}{1 - \frac{T_{SSB}}{T_{DU}}}$$

when the periodic resources (e.g., reference signals) of the co-located IAB-DU overlap with some but not all SSB occasions of the IAB-MT, or may be defined as "1" (e.g., no extension of the measurement time period is introduced by the second scaling factor, $P_{DU}$), when in the monitored cell the periodic resources of the co-located IAB-DU do not overlap with the SSB occasions of the IAB-MT. In some aspects, a $P_{DU}$ selected by the IAB node 1202 may be a $P_{DU}$ in the set of possible $P_{DU}$ values that is the smallest $P_{DU}$ value that is greater than the evaluated expression $$\frac{1}{1 - \frac{T_{SSB}}{T_{DU}}}.$$

Accordingly, the extended measurement period may be extended by a scaling factor P×$P_{DU}$, with P being calculated by either the IAB node 1202 or by the base station 1204 and $P_{DU}$ being selected from the set of possible $P_{DU}$ values based on the overlapping of the IAB-MT reference signals and the resources associated with the IAB-DU, respectively. In the examples above, $T_{DU}$ may denote the periodicity of the resources of the IAB-DU 1202a that are unavailable for the IAB-MT. For example, the resources may denote cell specific resources like SSB, RACH, system information, etc., at the IAB-DU 1202a. They may also refer to the resources that have been labelled as 'hard' resources to the IAB-DU 1202a.

The IAB-MT/DU configuration 1206 may include a resource allocation for IAB-DU resources (e.g., 'hard', 'soft', and 'not available' resources) and/or an indication of a reference signal configuration associated with the IAB-DU 1202a. For example, the IAB-MT/DU configuration 1206 may include a value for a periodicity, $T_{DU}$, of a reference signal associated with IAB-DU 1202a and/or a periodicity of a resource allocation, $T_{RA}$, associated with the IAB-DU 1202a. Based on the IAB-MT/DU configuration 1206 and the scaling factor ($P_{DU}$) values configuration 1208, the IAB node 1202 may extend 1210 the IAB-MT measurement period by selecting (or calculating) a composite scaling factor (e.g., P×$P_{DU}$). For example, based on conflicting resources of an IAB-MT and an MGRP and/or an SMTC as described above, the IAB node 1202 may determine a scaling factor, P, (e.g., as described above in relation to FIG. 10). The determined first scaling factor (P) may then be multiplied by the second scaling factor ($P_{DU}$) selected based on scaling factor ($P_{DU}$) values configuration 1208 to determine a composite scaling factor. In some aspects, the separate scaling factors P and $P_{DU}$ are used to calculate an expression for the extended measurement period as described in Table 2 above (e.g., Max(200× $K_1$, Ceil(10× $P_{DU}$× P× $K_1$)× $T_{SSB}$)). In some aspects, the composite scaling factor may be used in an expression (or definition), for example, expressions #1210a or #1210b, of an extended measurement period ($T_{evaluate}$) similar to the expression(s) found in Table 2. While a single value for an extended measurement period ($T_{evaluate}$) is referred to above in relation to FIGS. 7-12, it should be understood to refer to either an extended measurement period for an OOS monitoring period of RLM ($T_{Evaluate\_out\_SSB}$) or an extended measurement period for IS monitoring period of RLM ($T_{Evaluate\_in\_SSB}$).

The IAB-MT 1202b may measure 1214 a set of the IAB-MT reference signals 1212 over the extended measurement period (period '$T_{evaluate}$' of FIGS. 7 and 8). The measured 1214 reference signals may be a subset of the IAB-MT reference signals 1212. For example, the subset may include those IAB-MT reference signals that do not overlap with resources or reference signals associated with a co-located IAB-DU (e.g., IAB-DU 1202a).

Figure 13:
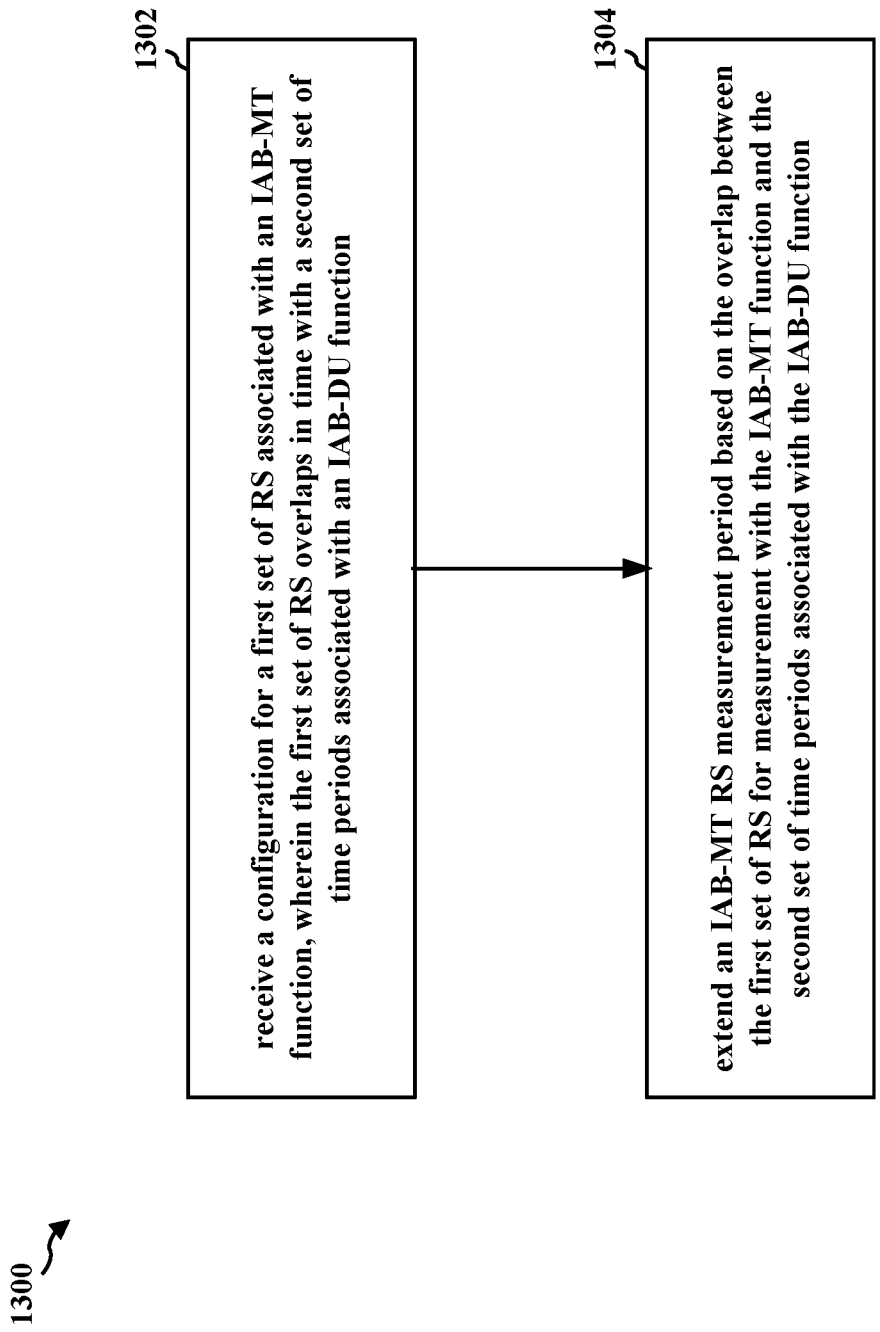
FIG. 13 is a flowchart of a method of wireless communication.

FIG. 13 is a flowchart 1300 of a method of wireless communication. The method may be performed by an IAB node (e.g., the base station 102/180; the IAB 420, 520, 902, 1002, 1102, or 1202; the apparatus 1902). At 1302, the IAB may receive a configuration for a first set of reference signals associated with an IAB-MT function of the IAB node, where the first set of reference signals overlaps in time with a second set of time periods associated with an IAB-DU function of the IAB node. The configuration for the first set of reference signals associated with the IAB-MT function of the IAB node may include a configuration for reference signals from a base station for measurement at the IAB-MT function of the IAB node. In some aspects, the configuration for the first set of reference signals associated with the IAB-MT function of the IAB node may also include an extended measurement period definition based on a periodicity of an SSB ($T_{SSB}$) a measurement gap repetition period (MGRP), a configured SMTC, and a periodicity ($T_{DU}$) of an IAB-DU reference signal (or allocated resource). The extended measurement period ($T_{evaluate}$) definition may include multiple scaling factors based on the types of overlapping reference signals/measurement gaps/allocated resources. For example, referring to FIGS. 9-12, the IAB node 902, 1002, 1102, and 1202 may receive an IAB-MT configuration 906 or an IAB-MT/DU configuration 1006, 1106, or 1206. For example, 1302 may be performed by IAB configuration component 1940.

At 1304, the IAB node may extend an IAB-MT reference signal measurement period based on the overlap between the first set of reference signals for measurement with the IAB-MT function and the second set of time periods associated with the IAB-DU function. For example, 1304 may be performed by measurement period configuration component 1942.

For example, referring to FIGS. 9-12, the IAB node 902, 1002, 1102, and 1202 may extend 910, 1008, 1110, and 1210. As described in relation to FIGS. 9-12, the IAB node 902, 1002, 1102, and 1202 may receive, at 1302, a configuration or definition for a measurement period (e.g., an extended measurement period ($T_{evaluate}$)) for a reference signal at an IAB-MT. For example, the definitions provided in the Tables above (e.g., Table 1 and Table 2) or similar Tables, definitions, or configurations for the measurement period. The IAB node may use the provided definition to determine or calculate a measurement period (e.g., an extended measurement period) based on the $T_{SSB}$, the MGRP, the configured SMTC, and the $T_{DU}$. The calculation may be performed by the IAB node, in some aspects, based on a received IAB-MT reference signal configuration 906 and the IAB-DU configuration 908, of FIG. 9 or based on a received IAB-MT/DU configuration 1006 of FIG. 10 as described above in relation to FIGS. 9 and 10. In some aspects, extending, at 1304, the measurement period may be performed based on an IAB-MT/DU configuration 1106 and a scaling factor ($P_{DU}$) configuration 1108 received from a base station 1104 of FIG. 11. Extending, at 1304, the measurement period may be performed, in some aspects, based on the IAB-MT/DU configuration 1206 and the scaling factor ($P_{DU}$) values configuration 1208 received from a base station 1204 of FIG. 12.

Figure 14:
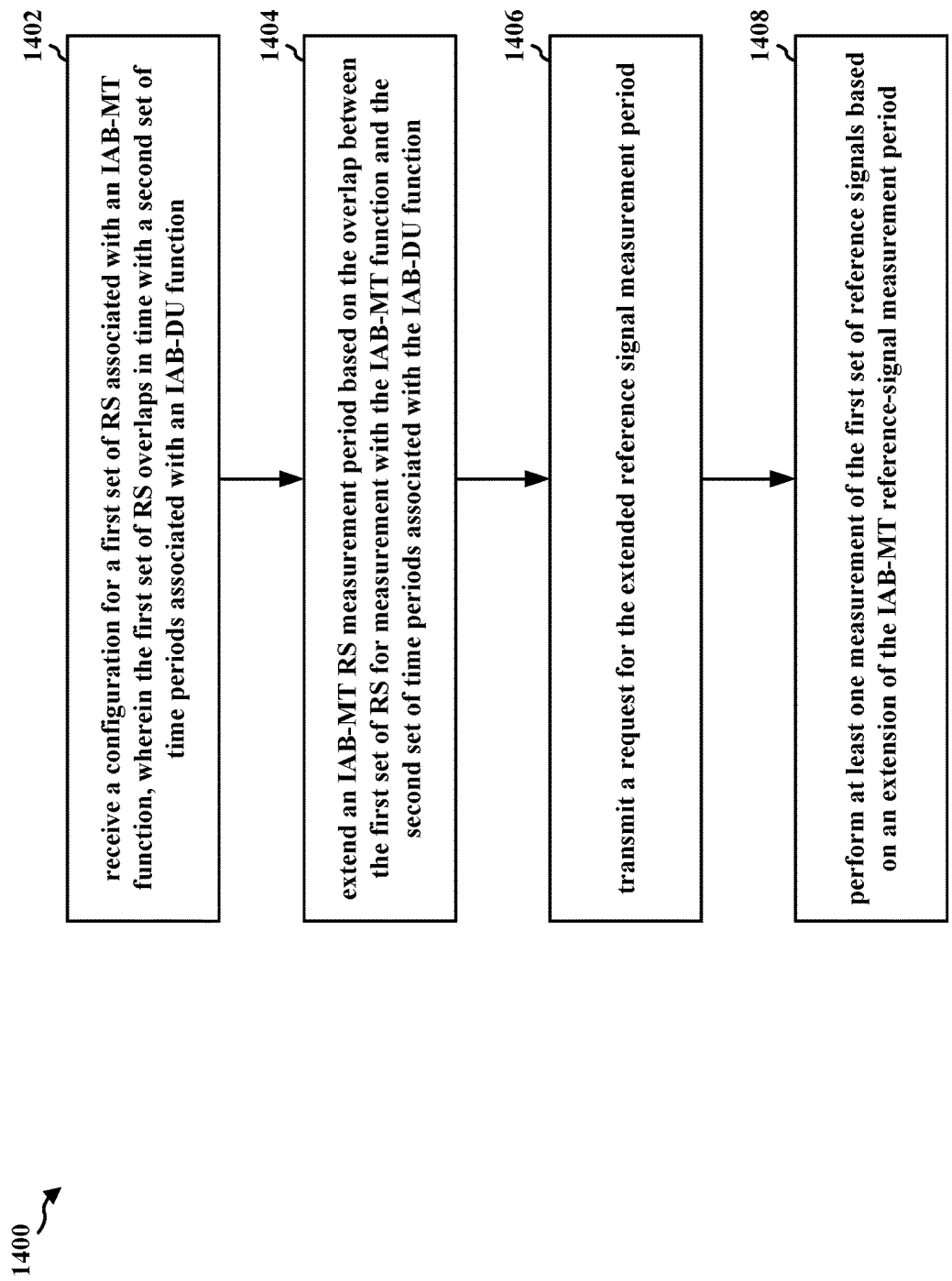
FIG. 14 is a flowchart of a method of wireless communication.

FIG. 14 is a flowchart 1400 of a method of wireless communication. The method may be performed by an IAB node (e.g., the base station 102/180; the IAB 420, 520, or 1002; the apparatus 1902). At 1402, the IAB may receive a configuration for a first set of reference signals associated with an IAB-MT function of the IAB node, where the first set of reference signals overlaps in time with a second set of time periods associated with an IAB-DU function of the IAB node. The configuration for the first set of reference signals associated with the IAB-MT function of the IAB node may include a configuration for reference signals from a base station for measurement at the IAB-MT. For example, 1402 may be performed by IAB configuration component 1940.

In some aspects, the configuration for the first set of reference signals associated with the IAB-MT function of the IAB node may also include an indication of a configuration of IAB-DU resources, while in some aspects the configuration for the first set of reference signals associated with the IAB-MT function may also include definitions for terms used in calculating (or determining) an extended measurement period (e.g., $T_{evaluate}$) or values (e.g., values for $T_{SSB}$, MGRP, and an SMTC, and/or $K_1$ and P) associated with a configuration of an extended measurement period. For example, referring to FIG. 10, the IAB node 1002 may receive IAB-MT/DU configuration 1006. The IAB-MT/DU configuration 1006 may include (1) a definition (or value) for a first scaling factor (P) based on a periodicity of an SSB ($T_{SSB}$), an MGRP, and an SMTC and (2) a definition of a second scaling factor ($P_{DU}$) based on a periodicity of the SSB ($T_{SSB}$) and a periodicity ($T_{DU}$) of an IAB-DU reference signal (or allocated resource).

For example, as described in relation to FIG. 10, for an IAB-MT measuring reference signals via FR1, an OOS or IS monitoring period of RLM may be defined in IAB-MT/DU configuration 1006. In some aspects, a table (e.g., Table 2 above or a similar table) may be provided specifying an evaluation period for determining OOS or IS status.

The IAB-MT/DU configuration 1006, in some aspects may further provide a definition for the term $K_1$ (e.g., for FR1, $K_1$ may equal 5) and a set of definitions for the scaling factors, P and $P_{DU}$, based on the $T_{SSB}$, the MGRP, the configured SMTC, and the $T_{DU}$. The first scaling factor (P) may be based on the $T_{SSB}$, the MGRP, and the configured SMTC, while the second scaling factor is based on the $T_{SSB}$ and the $T_{DU}$. For example, when, in the monitored cell (e.g., the IAB-MT 1002b) there are measurement gaps configured for intra-frequency, inter-frequency or inter-RAT measurements, and these measurement gaps are overlapping with some but not all occasions of the SSB, the first scaling factor (P) may be defined/calculated as $$\frac{1}{1 - \frac{T_{SSB}}{MGRP}}.$$

The second scaling factor ($P_{DU}$) may be defined/calculated as $$\frac{1}{1 - \frac{T_{SSB}}{T_{DU}}}$$

when the periodic resources (e.g., reference signals) of the co-located IAB-DU overlap with some but not all SSB occasions of the IAB-MT (e.g., configuration element 1006a). Accordingly, the extended measurement period may be extended by a scaling factor P×$P_{DU}$, with P and $P_{DU}$ being independently calculated/determined based on (1) the overlapping of the IAB-MT reference signals and a MGRP and (2) the overlapping of the IAB-MT reference signals and the resources associated with the IAB-DU, respectively.

Finally, P may be defined as "1" (e.g., no extension of the measurement time period is introduced by the first scaling factor, P), when in the monitored cell there are no measurement gaps overlapping with any occasion of the SSB, and $P_{DU}$ may be defined as "1" (e.g., no extension of the measurement time period is introduced by the second scaling factor, $P_{DU}$), when in the monitored cell the periodic resources of the co-located IAB-DU do not overlap with the SSB occasions of the IAB-MT (e.g., configuration element 1006b). In the examples above, $T_{DU}$ may denote the periodicity of the resources of IAB-DU that are unavailable for the IAB-MT. For example, these time resources may denote cell specific resources like SSB, RACH, system information, etc., at the IAB-DU. They may also refer to the resources that have been labelled as 'hard' resources to the IAB-DU.

At 1404, the IAB node may extend an IAB-MT reference signal measurement period based on the overlap between the first set of reference signals for measurement with the IAB-MT function and the second set of time periods associated with the IAB-DU function. For example, 1404 may be performed by measurement period configuration component 1942. Extending the IAB-MT reference signal measurement period may be based on a configuration of the IAB-MT resources (e.g., a periodicity ($T_{SSB}$)), a configuration of the IAB-DU resource allocation or reference signals (e.g., a periodicity ($T_{DU}$)), a MGRP, and/or a SMTC.

For example, referring to FIG. 10, the IAB node 1002 may extend 1008. As described in relation to FIG. 10, the IAB node 1002 may receive, at 1402, an IAB-MT/DU configuration 1006 including a configuration or definition for a measurement period (e.g., an extended measurement period ($T_{evaluate}$)) for a reference signal at an IAB-MT. For example, the definitions provided in Table 2 above or a similar table, definitions, or configurations for the measurement period. The IAB node may use the provided definition to determine or calculate a measurement period (e.g., an extended measurement period) based on the $T_{SSB}$, the MGRP, the configured SMTC, and the $T_{DU}$. the IAB node 1002 may extend 1008 the IAB-MT measurement period by selecting (or calculating) a scaling factor (e.g., the second scaling factor $P_{DU}$). For example, based on a determination that a particular set of circumstances relating to conflicting resources of an IAB-MT and an IAB-DU described above exists, the IAB node 1002 may determine a scaling factor, $P_{DU}$, based on one of the configuration elements 1006a or 1006b (e.g., the scaling factor may be based on the IAB-MT reference signal periodicity ($T_{SSB}$) and the IAB-DU resource allocation (or reference signal) periodicity ($T_{DU}$). In some aspects, the IAB node 1002 may also determine a scaling factor, P, based on the IAB-MT reference signal periodicity ($T_{SSB}$), the SMTC, and/or the MGRP when there is overlap between another resource, e.g., a measurement gap, with some but not all occasions of the SSB.

At 1406, the IAB node may transmit a request for the extended reference signal measurement period. The request for the extended reference signal measurement period may be transmitted, at 1406, via at least one of a PUSCH or a PUCCH. The request for the extended reference signal measurement period may be a request (or an indication) of a scaling factor ($P_{DU}$) based on an overlap (or conflict) of resources of an IAB-MT and a co-located IAB-DU. For example, referring to FIG. 10, the IAB node 1002 (e.g., IAB-MT 1002b) may transmit, and the base station 1004 may receive, a scaling factor ($P_{DU}$) indication 1010. In some aspects, the request for the extended reference signal measurement period may be transmitted, at 1406, by the IAB node before, or in conjunction with (e.g., as part of), extending the IAB-MT reference signal measurement period at 1404. For example, 1406 may be performed by measurement period configuration component 1942.

Finally, at 1408, the IAB node may perform at least one measurement of the first set of reference signals based on an extension of the IAB-MT reference-signal measurement period. For example, referring to FIG. 10, the IAB-MT 1002b may measure 1014 a set of the IAB-MT reference signals 1012 over the extended measurement period (period '$T_{evaluate}$' of FIGS. 7 and 8). The measured 1014 reference signals may be a subset of the IAB-MT reference signals 1012 (e.g., based on an overlap between an IAB-MT reference signal and resources associated with a co-located IAB-DU). For example, 1408 may be performed by IAB-MT reference signal measurement component 1944.

Figure 15:
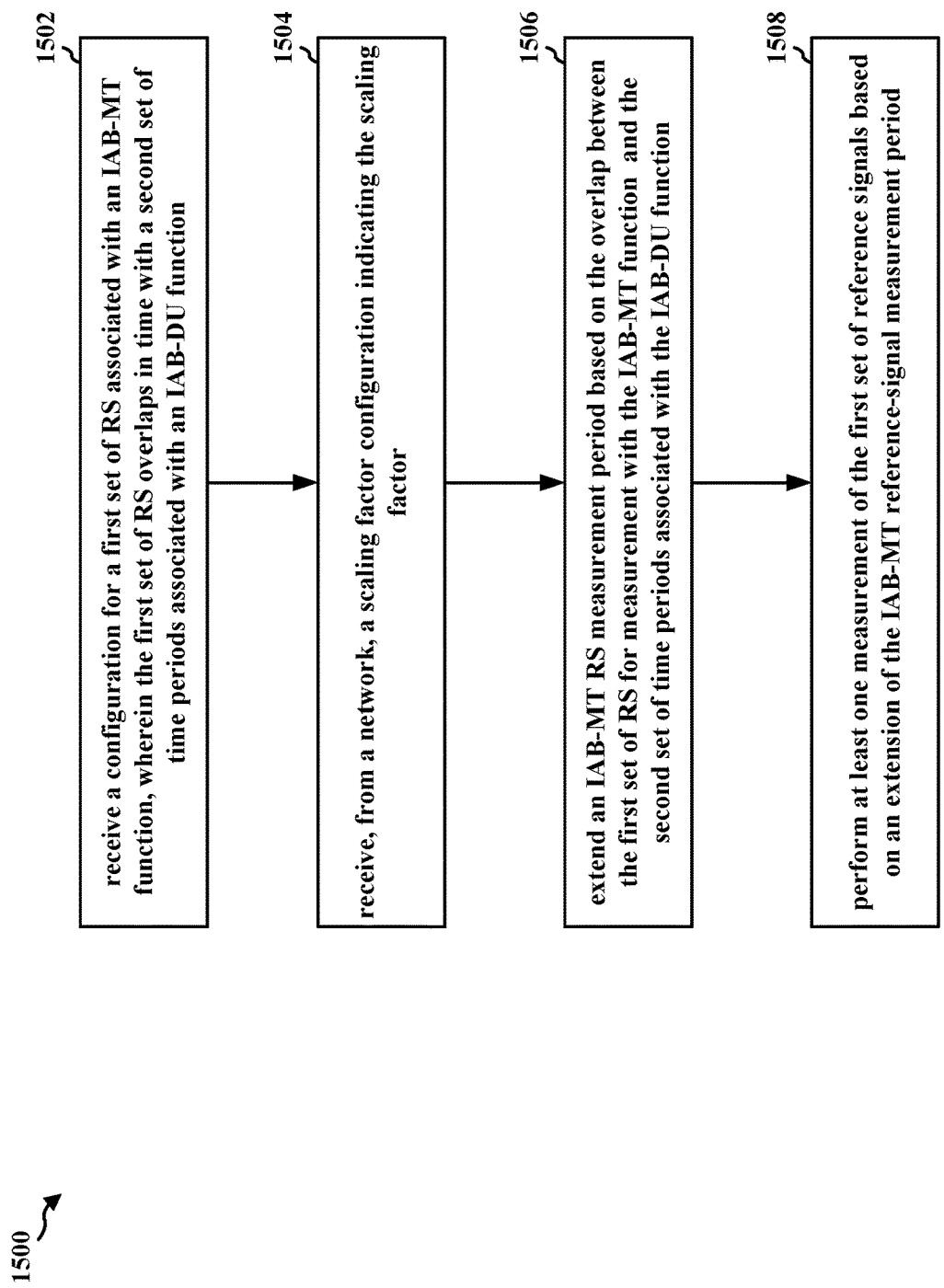
FIG. 15 is a flowchart of a method of wireless communication.

FIG. 15 is a flowchart 1500 of a method of wireless communication. The method may be performed by an IAB node (e.g., the base station 102/180; the IAB 420, 520, or 1102; the apparatus 1902). At 1502, the IAB node may receive a configuration for a first set of reference signals associated with an IAB-MT function of the IAB node, where the first set of reference signals overlaps in time with a second set of time periods associated with an IAB-DU function of the IAB node. The configuration for the first set of reference signals associated with the IAB-MT function of the IAB node may include a configuration for reference signals from a base station for measurement at the IAB-MT. For example, 1502 may be performed by IAB configuration component 1940.

In some aspects, the configuration for the first set of reference signals associated with the IAB-MT function of the IAB node may also include an indication of a configuration of IAB-DU resources, while in some aspects the configuration for the first set of reference signals associated with the IAB-MT function may also include definitions for terms used in calculating (or determining) an extended measurement period (e.g., $T_{evaluate}$) or values (e.g., values for $T_{SSB}$, MGRP, and an SMTC, and/or $K_1$ and P) associated with a configuration of an extended measurement period. For example, referring to FIG. 11, the IAB node 1102 may receive IAB-MT/DU configuration 1106. The IAB-MT/DU configuration 1106 may include (1) a definition for a first scaling factor (P) based on a periodicity of an SSB ($T_{SSB}$) a measurement gap repetition period (MGRP), and an SMTC and (2) a definition for an extended measurement period (e.g., $T_{evaluate}$) based on the first scaling factor (P) and a second scaling factor ($P_{DU}$).

For example, as described in relation to FIG. 11, for an IAB-MT measuring reference signals via FR1, an OOS or IS monitoring period of RLM may be defined in IAB-MT/DU configuration 1106. In some aspects, a table (e.g., Table 2 above or a similar table) may be provided specifying an evaluation period for determining OOS or IS status.

The IAB-MT/DU configuration 1106, in some aspects may further provide a definition for the term $K_1$ (e.g., for FR1, $K_1$ may equal 5) and a set of definitions for the scaling factor, P, based on the $T_{SSB}$, the MGRP, and the configured SMTC. For example, when, in the monitored cell (e.g., the IAB-MT 1102b) there are measurement gaps configured for intra-frequency, inter-frequency or inter-RAT measurements, and these measurement gaps are overlapping with some but not all occasions of the SSB, the first scaling factor (P) may be defined/calculated as $$\frac{1}{1 - \frac{T_{SSB}}{MGRP}}.$$

At 1504, the IAB node may receive, from a network, a scaling factor configuration indicating the scaling factor. For example, referring to FIG. 11, the IAB node 1102 (e.g., an IAB-MT 1102b) may receive, from a base station 1104, a second scaling factor ($P_{DU}$) configuration 1108 used to calculate the extended measurement period (e.g., $T_{evaluate}$). The second scaling factor ($P_{DU}$) may be calculated by the base station as $$\frac{1}{1 - \frac{T_{SSB}}{T_{DU}}}$$

when the periodic resources (e.g., reference signals) of the co-located IAB-DU overlap with some but not all SSB occasions of the IAB-MT (e.g., configuration element 1106a), or $P_{DU}$ may be defined as "1" (e.g., no extension of the measurement time period is introduced by the second scaling factor, $P_{DU}$), when in the monitored cell the periodic resources of the co-located IAB-DU do not overlap with the SSB occasions of the IAB-MT. For example, 1504 may be performed by IAB configuration component 1940.

Accordingly, the extended measurement period may be extended by a scaling factor $P \times P_{DU}$, with P being calculated by either the IAB node 1102 or by the base station 1104 and $P_{DU}$ being provided by the base station 1104 based on the overlapping of the IAB-MT reference signals and the resources associated with the IAB-DU, respectively. In the examples above, $T_{DU}$ may denote the periodicity of the resources of IAB-DU that are unavailable for the IAB-MT. For example, these time resources may denote cell specific resources like SSB, RACH, system information, etc., at the IAB-DU. They may also refer to the resources that have been labelled as 'hard' resources to the IAB-DU.

At 1506, the IAB node may extend an IAB-MT reference signal measurement period based on the overlap between the first set of reference signals for measurement with the IAB-MT function and the second set of time periods associated with the IAB-DU function. For example, 1506 may be performed by measurement period configuration component 1942. Extending the IAB-MT reference signal measurement period may be based on a configuration of the IAB-MT resources (e.g., a periodicity ($T_{SSB}$)), the scaling factor ($P_{DU}$) (e.g., based on a configuration of the IAB-DU resource allocation or reference signals), an MGRP, and/or an SMTC.

For example, referring to FIG. 11, the IAB node 1102 may extend 1110 the measurement period based on a configuration or definition for a measurement period (e.g., an extended measurement period ($T_{evaluate}$)) for a reference signal at an IAB-MT included in IAB-MT/DU configuration 1106 and the scaling factor ($P_{DU}$) configuration 1108.

Finally, at 1508, the IAB node may perform at least one measurement of the first set of reference signals based on an extension of the IAB-MT reference-signal measurement period. For example, referring to FIG. 11, the IAB-MT 1102b may measure 1114 a set of the IAB-MT reference signals 1112 over the extended measurement period (period '$T_{evaluate}$' of FIGS. 7 and 8). The measured 1114 reference signals may be a subset of the IAB-MT reference signals 1112 (e.g., based on an overlap between an IAB-MT reference signal and resources associated with a co-located IAB-DU). For example, 1508 may be performed by IAB-MT reference signal measurement component 1944.

Figure 16:
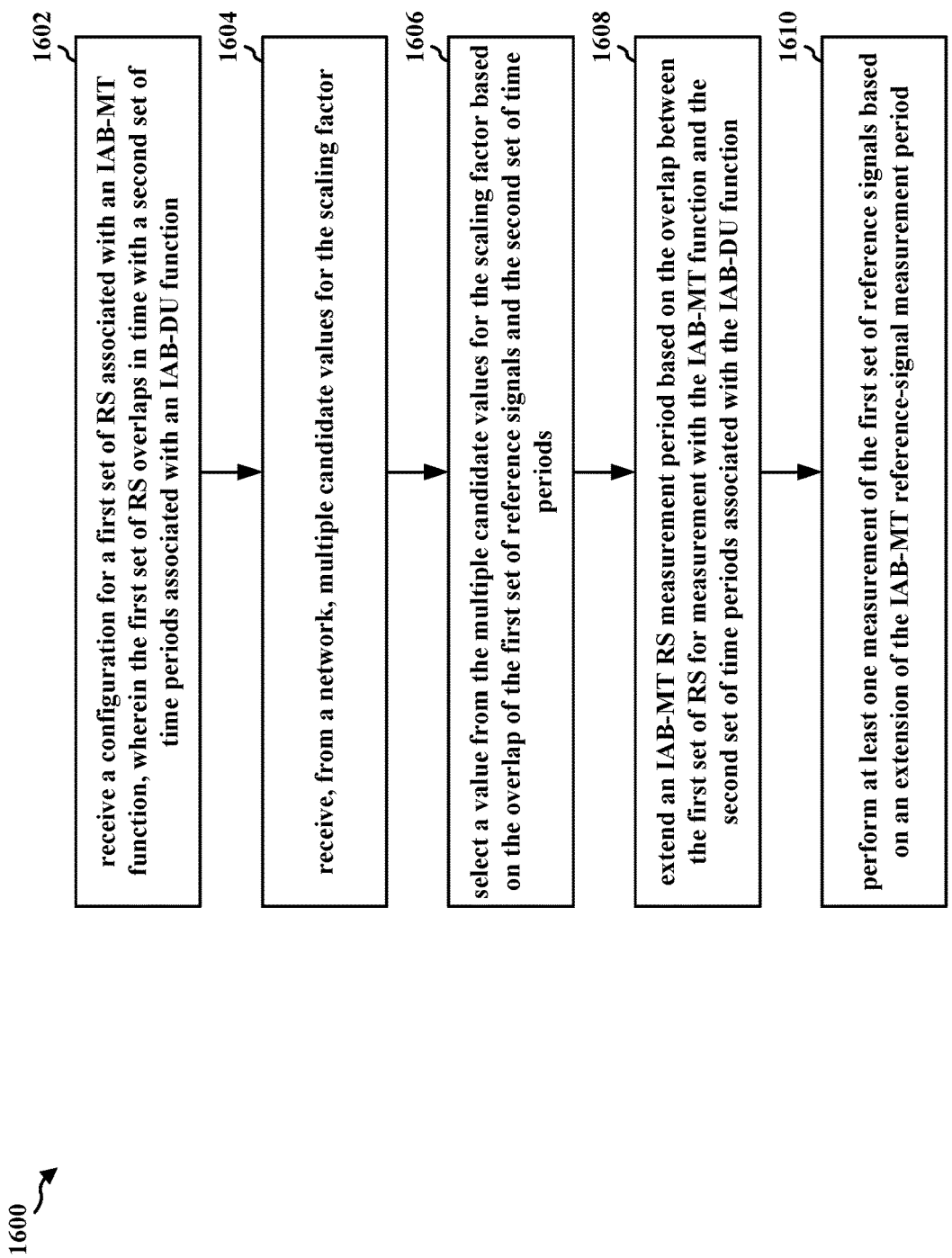
FIG. 16 is a flowchart of a method of wireless communication.

FIG. 16 is a flowchart 1600 of a method of wireless communication. The method may be performed by an IAB node (e.g., the base station 102/180; the IAB 420, 520, or 1202; the apparatus 1902). At 1602, the IAB may receive a configuration for a first set of reference signals associated with an IAB-MT function of the IAB node, where the first set of reference signals overlaps in time with a second set of time periods associated with an IAB-DU function of the IAB node. The configuration for the first set of reference signals associated with the IAB-MT function of the IAB node may include a configuration for reference signals from a base station for measurement at the IAB-MT. For example, 1602 may be performed by IAB configuration component 1940.

In some aspects, the configuration for the first set of reference signals associated with the IAB-MT function of the IAB node may also include an indication of a configuration of IAB-DU resources, while in some aspects the configuration for the first set of reference signals associated with the IAB-MT function may also include definitions for terms used in calculating (or determining) an extended measurement period (e.g., $T_{evaluate}$) or values (e.g., values for $T_{SSB}$, MGRP, and an SMTC, and/or $K_1$ and P) associated with a configuration of an extended measurement period. For example, referring to FIG. 12, the IAB node 1202 may receive IAB-MT/DU configuration 1206. The IAB-MT/DU configuration 1206 may include (1) a definition for a first scaling factor (P) based on a periodicity of an SSB ($T_{SSB}$) a measurement gap repetition period (MGRP), and an SMTC and (2) a definition for an extended measurement period (e.g., $T_{evaluate}$) based on the first scaling factor (P) and a second scaling factor ($P_{DU}$).

For example, as described in relation to FIG. 12, for an IAB-MT measuring reference signals via FR1, an OOS or IS monitoring period of RLM may be defined in IAB-MT/DU configuration 1206. In some aspects, a table (e.g., Table 2 above or a similar table) may be provided specifying an evaluation period for determining OOS or IS status.

The IAB-MT/DU configuration 1206, in some aspects may further provide a definition for the term $K_1$ (e.g., for FR1, $K_1$ may equal 5) and a set of definitions for the scaling factor, P, based on the $T_{SSB}$, the MGRP, and the configured SMTC. For example, when, in the monitored cell (e.g., the IAB-MT 1202b) there are measurement gaps configured for intra-frequency, inter-frequency or inter-RAT measurements, and these measurement gaps are overlapping with some but not all occasions of the SSB, the first scaling factor (P) may be defined/calculated as $$\frac{1}{1 - \frac{T_{SSB}}{MGRP}}.$$

At 1604, the IAB node may receive, from a network, multiple candidate values for the scaling factor. For example, referring to FIG. 12, the IAB node 1202 (e.g., an IAB-MT 1202b) may receive, from a base station 1204, a second scaling factor ($P_{DU}$) values configuration 1208 used to calculate the extended measurement period (e.g., $T_{evaluate}$). The scaling factor ($P_{DU}$) values configuration 1208 may include a set of possible (or candidate) values for the second scaling factor ($P_{DU}$). In some aspects, the set of possible values may include an ordered and/or indexed list. For example, 1604 may be performed by IAB configuration component 1940.

At 1606, the IAB node may select a value from the multiple candidate values for the scaling factor based on the overlap of the first set of reference signals and the second set of time periods. The value may be selected based on the values for the periodicity ($T_{SSB}$) of the reference signals associated with the IAB-MT and the periodicity ($T_{DU}$) of the resources or reference signals associated with the IAB-DU. For example, 1606 may be performed by measurement period configuration component 1942.

For example, referring to FIG. 12, the second scaling factor ($P_{DU}$) may be calculated based on the expression $$\frac{1}{1 - \frac{T_{SSB}}{T_{DU}}}$$

when the periodic resources (e.g., reference signals) of the co-located IAB-DU overlap with some but not all SSB occasions of the IAB-MT (e.g., configuration element 1206a), or may be defined as "1" (e.g., no extension of the measurement time period is introduced by the second scaling factor, $P_{DU}$), when in the monitored cell the periodic resources of the co-located IAB-DU do not overlap with the SSB occasions of the IAB-MT. In some aspects, a $P_{DU}$ selected by the IAB node 1202 may be a $P_{DU}$ in the set of possible $P_{DU}$ values that is the smallest $P_{DU}$ value that is greater than the evaluated expression $$\frac{1}{1 - \frac{T_{SSB}}{T_{DU}}}.$$

At 1608, the IAB node may extend an IAB-MT reference signal measurement period based on the overlap between the first set of reference signals for measurement with the IAB-MT function and the second set of time periods associated with the IAB-DU function. For example, 1608 may be performed by measurement period configuration component 1942. Extending the IAB-MT reference signal measurement period may be based on a configuration of the IAB-MT resources (e.g., a periodicity ($T_{SSB}$)), the selected scaling factor ($P_{DU}$) (e.g., based on a configuration of the IAB-DU resource allocation or reference signals), an MGRP, and/or an SMTC.

Accordingly, the extended measurement period may be extended by a scaling factor $P \times P_{DU}$, with P being calculated by either the IAB node 1202 or by the base station 1204 and $P_{DU}$ being provided by the base station 1204 based on the overlapping of the IAB-MT reference signals and the resources associated with the IAB-DU, respectively. In the examples above, $T_{DU}$ may denote the periodicity of the resources of IAB-DU that are unavailable for the IAB-MT. For example, these time resources may denote cell specific resources like SSB, RACH, system information, etc., at the IAB-DU. They may also refer to the resources that have been labelled as 'hard' resources to the IAB-DU.

Finally, at 1610, the IAB node may perform at least one measurement of the first set of reference signals based on an extension of the IAB-MT reference-signal measurement period. For example, referring to FIG. 12, the IAB-MT 1202b may measure 1214 a set of the IAB-MT reference signals 1212 over the extended measurement period (period '$T_{evaluate}$' of FIGS. 7 and 8). The measured 1214 reference signals may be a subset of the IAB-MT reference signals 1212 (e.g., based on an overlap between an IAB-MT reference signal and resources associated with a co-located IAB-DU). For example, 1610 may be performed by IAB-MT reference signal measurement component 1944.

Figure 17:
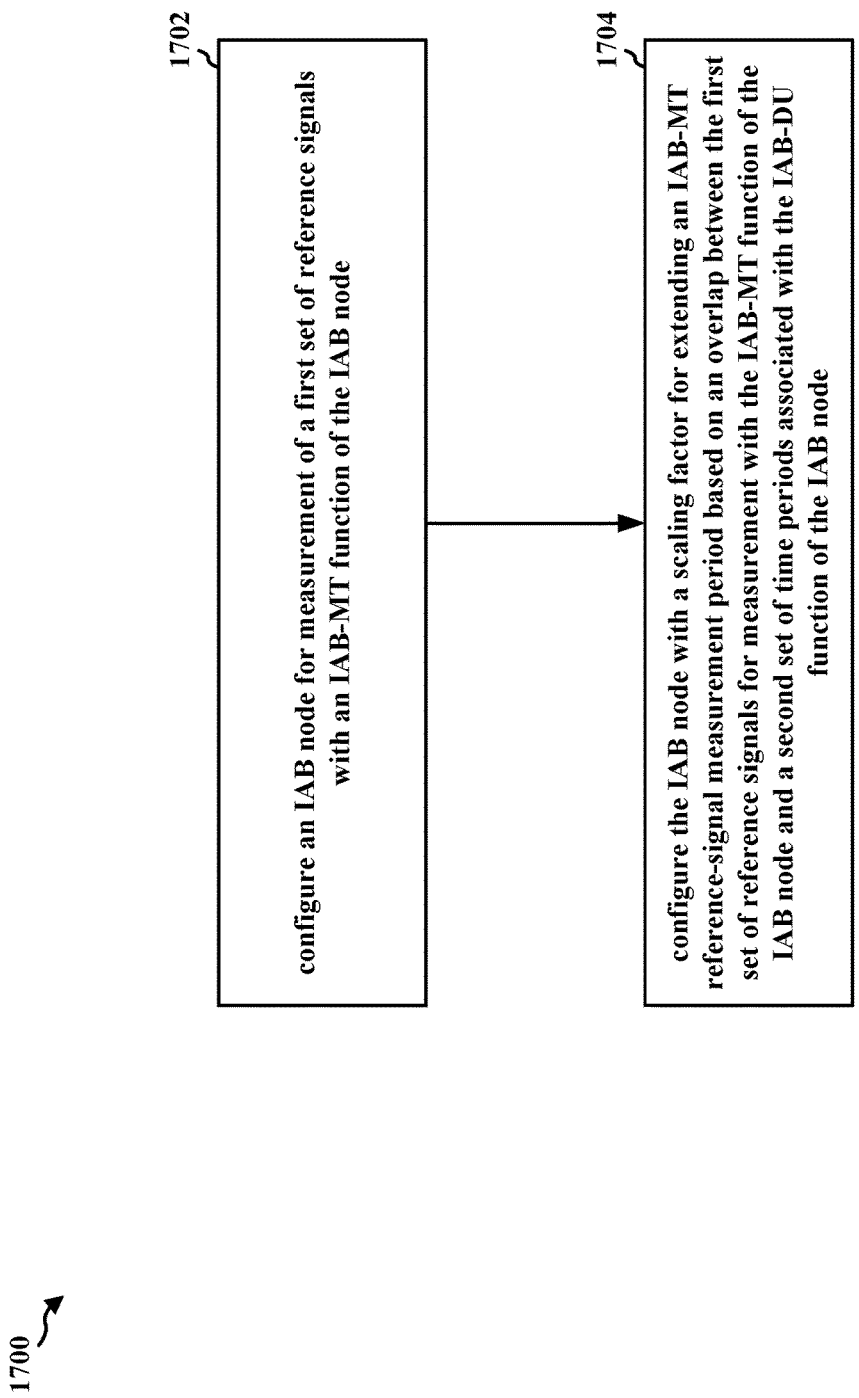
FIG. 17 is a flowchart of a method of wireless communication.

FIG. 17 is a flowchart 1700 of a method of wireless communication. The method may be performed by a base station (e.g., the base station 102/180, 410, 510, 904, 1004, 1104, or 1204; the apparatus 2002). At 1702, the base station may configure an IAB node for measurement of a first set of reference signals with an IAB-MT function of the IAB node. The configuration for the measurement of the first set of reference signals with an IAB-MT function of the IAB node may include a configuration for reference signals from the base station for measurement at the IAB-MT function of the IAB node. In some aspects, the configuration for the measurement of the first set of reference signals associated with the IAB-MT function of the IAB node may also include an extended measurement period definition based on a periodicity of an SSB ($T_{SSB}$) a measurement gap repetition period (MGRP), a configured SMTC, and a periodicity ($T_{DU}$) of an IAB-DU reference signal (or allocated resource). The extended measurement period ($T_{evaluate}$) definition may include multiple scaling factors based on the types of overlapping reference signals/measurement gaps/allocated resources.

For example, referring to FIGS. 9-12, the base station 904, 1004, 1104, and 1204 may transmit an IAB-MT configuration 906 or an IAB-MT/DU configuration 1006, 1106, or 1206. For example, 1702 may be performed by IAB configuration component 2040.

At 1704, the base station may configure the IAB node with a scaling factor for extending an IAB-MT reference-signal measurement period based on an overlap between the first set of reference signals for measurement with the IAB-MT function of the IAB node and a second set of time periods associated with the IAB-DU function of the IAB node. For example, 1704 may be performed by measurement period configuration component 2042.

For example, referring to FIGS. 9-12, the base station 904, 1004, 1104, and 1204 may configure the IAB node 902, 1002, 1102, or 1202 with a scaling factor (e.g., a definition of a scaling factor (P or P and $P_{DU}$) or scaling factor ($P_{DU}$) configuration 1108 as in FIGS. 9-12). As described in relation to FIGS. 9-12, the base station 904, 1004, 1104, and 1204 may configure, at 1704, the IAB node 902, 1002, 1102, or 1202 with a configuration or definition for a measurement period (e.g., an extended measurement period ($T_{evaluate}$)) for a reference signal at an IAB-MT. For example, the definitions provided in the Tables above (e.g., Table 1 and Table 2) or similar Tables, definitions, or configurations for the measurement period. The IAB node may be configured to use the provided definition to determine or calculate a measurement period (e.g., an extended measurement period) based on the $T_{SSB}$, the MGRP, the configured SMTC, and the $T_{DU}$. The IAB node, in some aspects, may be configured with the scaling factor as described in relation to the received IAB-MT reference signal configuration 906 and the IAB-DU configuration 908 of FIG. 9, the received IAB-MT/DU configuration 1006 of FIG. 10, the received IAB-MT/DU configuration 1106 and scaling factor ($P_{DU}$) configuration 1108 of FIG. 11, or the IAB-MT/DU configuration 1206 and the scaling factor ($P_{DU}$) values configuration 1208 of FIG. 12.

Figure 18:
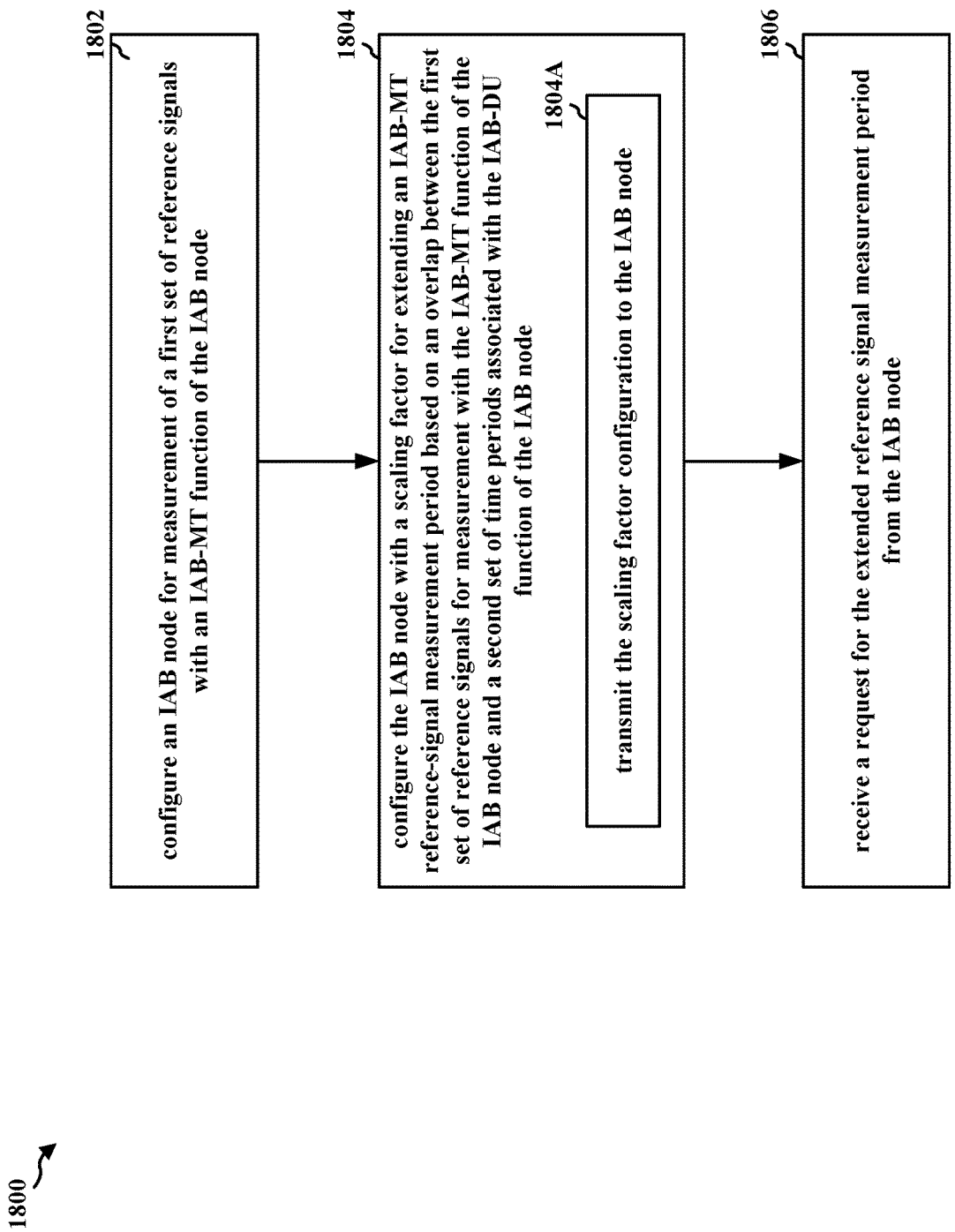
FIG. 18 is a flowchart of a method of wireless communication.

FIG. 18 is a flowchart 1800 of a method of wireless communication. The method may be performed by a base station (e.g., the base station 102/180, 410, 510, 904, 1004, 1104, or 1204; the apparatus 2002). At 1802, the base station may configure an IAB node for measurement of a first set of reference signals with an IAB-MT function of the IAB node. The configuration for the measurement of the first set of reference signals with an IAB-MT function of the IAB node may include a configuration for reference signals from the base station for measurement at the IAB-MT function of the IAB node. In some aspects, the configuration for the measurement of the first set of reference signals associated with the IAB-MT function of the IAB node may also include an extended measurement period definition based on a periodicity of an SSB ($T_{SSB}$) a measurement gap repetition period (MGRP), a configured SMTC, and a periodicity ($T_{DU}$) of an IAB-DU reference signal (or allocated resource). The extended measurement period ($T_{evaluate}$) definition may include multiple scaling factors based on the types of overlapping reference signals/measurement gaps/allocated resources. For example, referring to FIGS. 9-12, the base station 904, 1004, 1104, and 1204 may transmit an IAB-MT configuration 906 or an IAB-MT/DU configuration 1006, 1106, or 1206. For example, 1802 may be performed by IAB configuration component 2040.

At 1804, the base station may configure the IAB node with a scaling factor for extending an IAB-MT reference-signal measurement period based on an overlap between the first set of reference signals for measurement with the IAB-MT function of the IAB node and a second set of time periods associated with the IAB-DU function of the IAB node. For example, 1804 may be performed by measurement period configuration component 2042.

For example, referring to FIGS. 9-12, the base station 904, 1004, 1104, and 1204 may configure the IAB node 902, 1002, 1102, or 1202 with a scaling factor (e.g., a definition of a scaling factor (P or P and $P_{DU}$) or scaling factor ($P_{DU}$) configuration 1108 as in FIGS. 9-12). As described in relation to FIGS. 9-12, the base station 904, 1004, 1104, and 1204 may configure, at 1804, the IAB node 902, 1002, 1102, or 1202 with a configuration or definition for a measurement period (e.g., an extended measurement period ($T_{evaluate}$)) for a reference signal at an IAB-MT. For example, the definitions provided in the Tables above (e.g., Table 1 and Table 2) or similar Tables, definitions, or configurations for the measurement period. The IAB node may be configured to use the provided definition to determine or calculate a measurement period (e.g., an extended measurement period) based on the $T_{SSB}$, the MGRP, the configured SMTC, and the $T_{DU}$. The IAB node, in some aspects, may be configured with a scaling factor definition as described in relation to the transmitted IAB-MT reference signal configuration 906 and the IAB-DU configuration 908 of FIG. 9 or the transmitted IAB-MT/DU configuration 1006 of FIG. 10. In some aspects, the base station may transmit a scaling factor configuration (e.g., a value or set of possible values for $P_{DU}$) to the IAB node as described in relation to the transmitted IAB-MT/DU configuration 1106 and scaling factor ($P_{DU}$) configuration 1108 of FIG. 11 or the transmitted IAB-MT/DU configuration 1206 and the scaling factor ($P_{DU}$) values configuration 1208 of FIG. 12.

Finally, at 1806 the base station may receive a request for the extended reference signal measurement period from the IAB node. The request may include an indication of a scaling factor calculated (or selected) by an IAB node. For example, referring to FIG. 10, the base station 1004 may receive a scaling factor ($P_{DU}$) indication 1010 from the IAB node 1002. As described in relation to FIG. 10, the scaling factor ($P_{DU}$) may be based on the configuration of the IAB-MT reference signals and resources allocated to the IAB-DU or reference signals associated with the IAB-DU. For example, 1806 may be performed by measurement period configuration component 2042.

Figure 19:
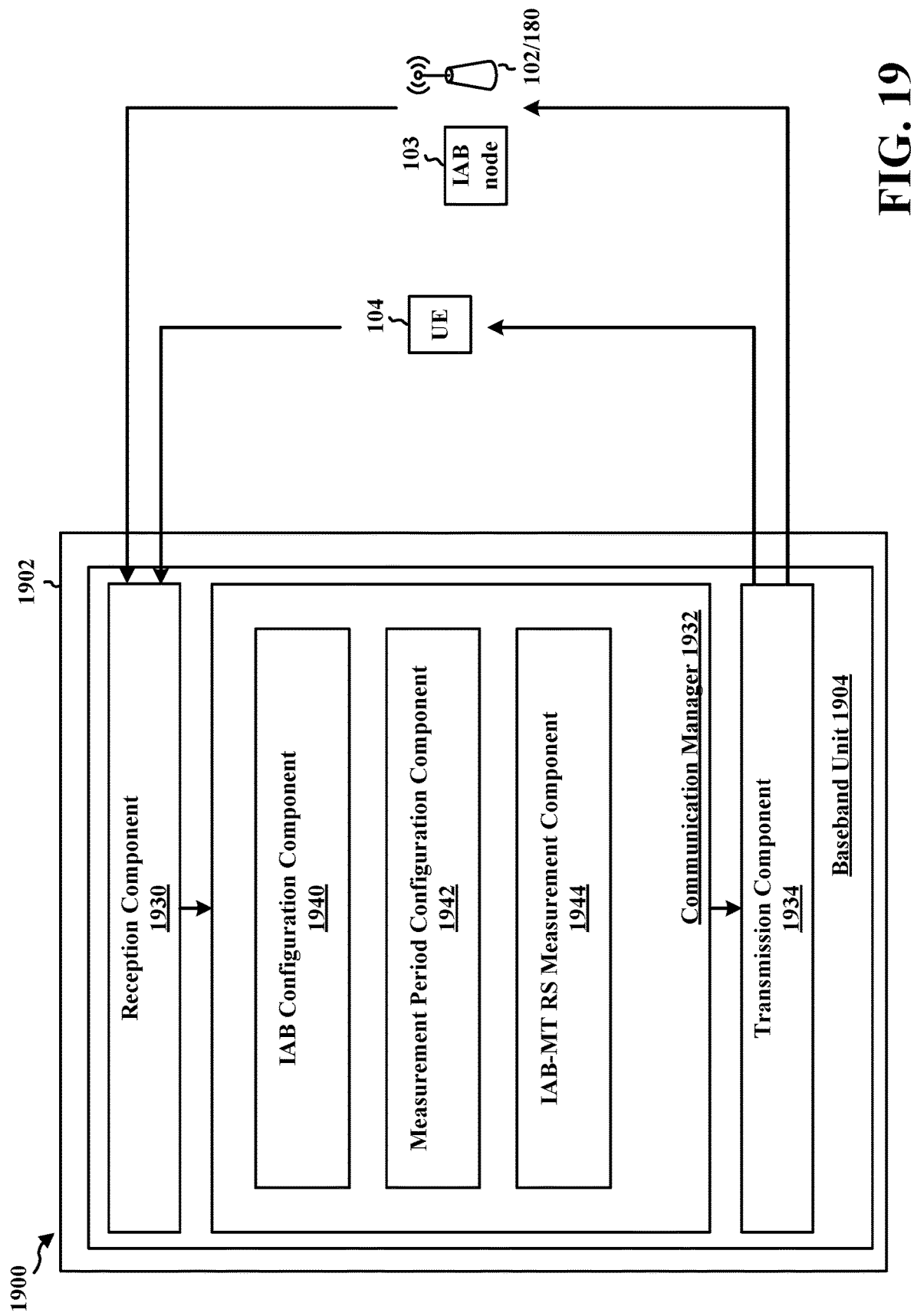
FIG. 19 is a diagram illustrating an example of a hardware implementation for an example apparatus.

FIG. 19 is a diagram 1900 illustrating an example of a hardware implementation for an apparatus 1902. The apparatus 1902 may be an IAB node or a component of an IAB node and includes a baseband unit 1904. The baseband unit 1904 may communicate through a cellular RF transceiver with one or more UEs 104. The baseband unit 1904 may also communicate through a cellular RF transceiver with one or more IAB nodes 103. The IAB node 103 may be a parent node of the apparatus or may be a child node of the apparatus. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the IAB node 103, which may correspond to and may include the memory 376 and/or at least one of the TX processor 316, the RX processor 370, and the controller/processor 375.

The communication manager 1932 includes an IAB configuration component 1940 that may be configured to receive a configuration for a first set of reference signals associated with an IAB-MT function of the IAB node, receive a scaling factor configuration indicating the scaling factor, and/or receive multiple candidate values for the scaling factor, e.g., as described in connection with 1302, 1402, 1502, 1504, 1602, and 1604 of FIGS. 13-16. The communication manager 1932 may further include a measurement period configuration component 1942 that may be configured to extend an IAB-MT reference signal measurement period based on the overlap between the first set of reference signals for measurement with the IAB-MT function and the second set of time periods associated with the IAB-DU function, select a value from the multiple candidate values for the scaling factor based on the overlap of the first set of reference signals and the second set of time periods, and/or transmit a request for the extended reference signal measurement period, e.g., as described in connection with 1304, 1404, 1406, 1506, 1606, and 1608 of FIGS. 13-16. The communication manager 1932 may further include an IAB-MT reference signal measurement component 1944 that may be configured to perform at least one measurement of the first set of reference signals based on an extension of the IAB-MT reference-signal measurement period, e.g., as described in connection with 1408, 1508, and 1610 of FIGS. 14-16.

The apparatus may include additional components that perform each of the blocks of the algorithm in the aforementioned flowcharts of FIGS. 13-16. As such, each block in the aforementioned flowcharts of FIGS. 13-16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for receiving a configuration for a first set of reference signals associated with an IAB-MT function of the IAB node, where the first set of reference signals overlaps in time with a second set of time periods associated with an IAB-DU function of the IAB node. The apparatus 1902, and in particular the baseband unit 1904, may further include means for extending an IAB-MT reference-signal measurement period based on the overlap between the first set of reference signals for measurement with the IAB-MT function of the IAB node and the second set of time periods associated with the IAB-DU function of the IAB node. The apparatus 1902, and in particular the baseband unit 1904, may further include means for receiving, from a network, a scaling factor configuration indicating the scaling factor. The apparatus 1902, and in particular the baseband unit 1904, may further include means for transmitting a request for the extended reference signal measurement period via at least one of a PUSCH or a PUCCH. The apparatus 1902, and in particular the baseband unit 1904, may further include means for receiving, from a network, a plurality of candidate values for the scaling factor. The apparatus 1902, and in particular the baseband unit 1904, may further include means for selecting a value from the plurality of candidate values for the scaling factor based on the overlap of the first set of reference signals and the second set of time periods. The apparatus 1902, and in particular the baseband unit 1904, may further include means for performing at least one measurement of the first set of reference signals based on an extension of the IAB-MT reference-signal measurement period. The aforementioned means may be one or more of the aforementioned components of the apparatus 1902 configured to perform the functions recited by the aforementioned means. As described supra, the apparatus 1902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 20:
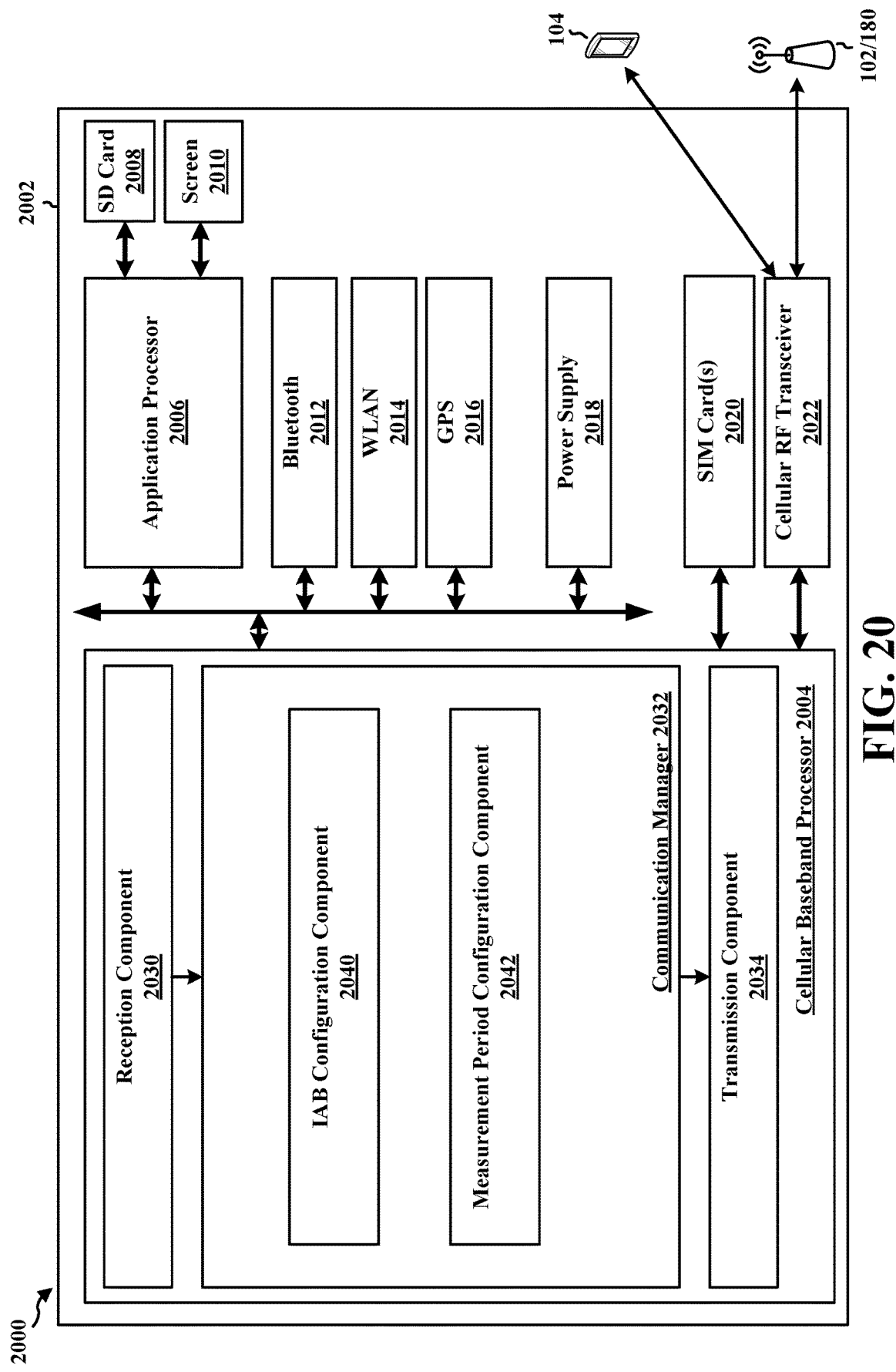
FIG. 20 is a diagram illustrating an example of a hardware implementation for an example apparatus.

FIG. 20 is a diagram 2000 illustrating an example of a hardware implementation for an apparatus 2002. The apparatus 2002 is a UE and includes a cellular baseband processor 2004 (also referred to as a modem) coupled to a cellular RF transceiver 2022 and one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, and a power supply 2018. The cellular baseband processor 2004 communicates through the cellular RF transceiver 2022 with the UE 104 and/or BS 102/180. The cellular baseband processor 2004 may include a computer-readable medium/memory. The cellular baseband processor 2004 is responsible for general processing, including the execution of software stored on the computer-readable medium/memory. The software, when executed by the cellular baseband processor 2004, causes the cellular baseband processor 2004 to perform the various functions described supra. The computer-readable medium/memory may also be used for storing data that is manipulated by the cellular baseband processor 2004 when executing software. The cellular baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the cellular baseband processor 2004. The cellular baseband processor 2004 may be a component of the wireless device 350 and may include the memory 360 and/or at least one of the TX processor 368, the RX processor 356, and the controller/processor 359. In one configuration, the apparatus 2002 may be a modem chip and include just the baseband processor 2004, and in another configuration, the apparatus 2002 may be the entire UE (e.g., see 350 of FIG. 3) and include the additional modules of the apparatus 2002.

The communication manager 2032 includes an IAB configuration component 2040 that is configured to configure an IAB node for measurement of a first set of reference signals with an IAB-MT function of the IAB node, e.g., as described in connection with 1702 and 1802 of FIGS. 17 and 18. The communication manager 2032 further includes a measurement period configuration component 2042 that may be configured to configure the IAB node with a scaling factor for extending an IAB-MT reference-signal measurement period based on an overlap between the first set of reference signals for measurement with the IAB-MT function of the IAB node and a second set of time periods associated with the IAB-DU function of the IAB node, transmit the scaling factor configuration to the IAB node, and/or receive a request for the extended reference signal measurement period from the IAB node, e.g., as described in connection with 1704, 1804, 1804A and 1806 of FIGS. 17 and 18.

The apparatus may include additional components that perform each of the blocks of the algorithm in the aforementioned flowcharts of FIGS. 17 and 18. As such, each block in the aforementioned flowcharts of FIGS. 17 and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2002, and in particular the cellular baseband processor 2004, includes means for configuring an IAB node for measurement of a first set of reference signals with an IAB-MT function of the IAB node. The apparatus 2002, and in particular the cellular baseband processor 2004, may further include means for configuring the IAB node with a scaling factor for extending an IAB-MT reference-signal measurement period based on an overlap between the first set of reference signals for measurement with the IAB-MT function of the IAB node and a second set of time periods associated with the IAB-DU function of the IAB node. The apparatus 2002, and in particular the cellular baseband processor 2004, may further include means for transmitting the scaling factor configuration via at least one of an RRC message, a MAC-CE, or DCI. The apparatus 2002, and in particular the cellular baseband processor 2004, may further include means for receiving a request for the extended reference signal measurement period via at least one of a PUSCH or a PUCCH from the IAB node. The aforementioned means may be one or more of the aforementioned components of the apparatus 2002 configured to perform the functions recited by the aforementioned means. As described supra, the apparatus 2002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In some aspects of wireless communication, e.g., 5G NR, a network node (e.g., a UE or IAB node) is required to measure beam and cell level reference signals from a parent node within a certain period. In a half-duplex IAB network, an IAB-MT (e.g., an IAB-MT function of an IAB node) may need to skip measuring beam or cell level reference signals if they overlap with communication of a co-located IAB-DU (e.g., an IAB-DU function of the IAB node). In such situations, it may be beneficial to extend a measurement period of the IAB-MT so that both the IAB-MT and IAB-DU can communicate smoothly.

In some aspects, the extended measurement period may be defined in a technical specification (e.g., for 5G NR, such as 3GPP TS 38.174 relating to integrated access and backhaul radio transmission and reception). The definition in the technical specification may be defined in terms of (e.g., may depend on) a periodicity of IAB-MT resources (e.g., reference signals or resource allocations) a periodicity of IAB-DU resources (e.g., reference signals or resource allocations), a configured SSB measurement timing configuration (SMTC), and/or a measurement gap of the IAB-MT.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive a configuration for a first set of reference signals associated with an IAB-MT function of the IAB node, where the first set of reference signals overlaps in time with a second set of time periods associated with an IAB-DU function of the IAB node and extend an IAB-MT reference-signal measurement period based on the overlap between the first set of reference signals for measurement with the IAB-MT function of the IAB node and the second set of time periods associated with the IAB-DU function of the IAB node.

Aspect 2 is the apparatus of aspect 1, where extending the IAB-MT reference-signal measurement period includes scaling a baseline reference-signal measurement period with a scaling factor.

Aspect 3 is the apparatus of any aspect 2, where the scaling factor is based on the overlap between the first set of reference signals associated with the IAB-MT function and the second set of time periods associated with the IAB-DU function.

Aspect 4 is the apparatus of any of aspects 2 or 3, the at least one processor further configured to receive, from a network, a scaling factor configuration indicating the scaling factor.

Aspect 5 is the apparatus of aspect 4, where the scaling factor configuration is received via at least one of an RRC message, a MAC-CE, or DCI.

Aspect 6 is the apparatus of any of aspects 4 or 5, the at least one processor further configured to transmit a request for the extended reference signal measurement period via at least one of a PUSCH or a PUCCH.

Aspect 7 is the apparatus of any of aspects 2 to 6, the at least one processor further configured to receive, from a network, multiple candidate values for the scaling factor; and select a value from multiple candidate values for the scaling factor based on the overlap of the first set of reference signals and the second set of time periods.

Aspect 8 is the apparatus of any of aspects 1 to 7, where extending the IAB-MT reference-signal measurement period is further based on one or more of a periodicity of an SMTC and an MG configuration.

Aspect 9 is the apparatus of any of aspects 1 to 8, where the configuration of the first set of reference signals includes at least one of a radio link monitoring reference signal configuration, a beam failure detection reference signal configuration, a candidate beam detection reference signal configuration, an SMTC, or an MG configuration.

Aspect 10 is the apparatus of any of aspects 1 to 9, where the first set of reference signals includes at least one of an SSB, or a CSI-RS.

Aspect 11 is the apparatus of any of aspects 1 to 10, where the second set of time periods is associated with hard time resources for the IAB-DU function that are not available for the measurement of the first set of reference signals by the IAB-MT function.

Aspect 12 is the apparatus of any of aspects 1 to 10, where the second set of time periods comprise flexible time resources that have been released to the IAB node.

Aspect 13 is the apparatus of any of aspects 1 to 10, where the second set of time periods comprise cell-specific communication time resources.

Aspect 14 is the apparatus of aspect 13, where the cell-specific communication time resources are for at least one of an SSB, a RACH communication, a system information communication, or a paging communication.

Aspect 15 is the apparatus of any of aspects 1 to 10, where the second set of time periods comprise guard symbols at the IAB node for switching between the IAB-MT function and the IAB-DU function.

Aspect 16 is the apparatus of any of aspects 1 or 15, the at least one processor further configured to perform at least one measurement of the first set of reference signals based on an extension of the IAB-MT reference-signal measurement period.

Aspect 17 is the apparatus of aspect 16, where the at least one measurement includes one or more of radio link monitoring, beam failure detection, a cell detection measurement, or an intra-frequency neighbor cell measurement.

Aspect 18 is the apparatus of any of aspects 1 to 15, further including at least one transceiver coupled to the at least one processor.

Aspect 19 is an apparatus for wireless communication including at least one processor coupled to a memory and configured to configure an IAB node for measurement of a first set of reference signals with an IAB-MT function of the IAB node, and configure the IAB node with a scaling factor for extending an IAB-MT reference-signal measurement period based on an overlap between the first set of reference signals for measurement with the IAB-MT function of the IAB node and a second set of time periods associated with an IAB-DU function of the IAB node.

Aspect 20 is the apparatus of aspect 19, the at least one processor further configured to transmit the scaling factor configuration via at least one of an RRC message, a MAC-CE, or DCI.

Aspect 21 is the apparatus of any of aspects 19 or 20, the at least one processor further configured to receive a request for the extended reference signal measurement period via at least one of a PUSCH or a PUCCH from the IAB node.

Aspect 22 is the apparatus of any of aspects 19 to 21, where configuring the scaling factor includes transmitting a plurality of candidate values for the scaling factor that are selectable based on the overlap of the first set of reference signals and the second set of time periods.

Aspect 23 is the apparatus of any of aspects 19 to 22, where a configuration of the first set of reference signals comprises at least one of radio link monitoring reference signals, beam failure detection reference signals, candidate beam detection reference signals, an SMTC, or an MG configuration.

Aspect 24 is the apparatus of any of aspects 19 to 23, where the first set of reference signals comprises at least one of an SSB, or a CSI-RS.

Aspect 25 is the apparatus of any of aspects 19 to 24, where the second set of time periods comprise one or more of hard time resources for the IAB-DU function that are not available for the measurement of the first set of reference signals by the IAB-MT function, flexible time resources that have been released to the IAB node by a network node, cell-specific communication time resources, or guard symbols at the IAB node that for switching between the IAB-MT function and the IAB-DU function.

Aspect 26 is the apparatus of any of aspects 19 to 23, where the measurement includes one or more of radio link monitoring, beam failure detection, a cell detection measurement, or an intra-frequency neighbor cell measurement.

Aspect 27 is the apparatus of any of aspects 19 to 23, further at least one transceiver coupled to the at least one processor.

Aspect 28 is a method of wireless communication for implementing any of aspects 1 to 27.

Aspect 29 is an apparatus for wireless communication including means for implementing any of aspects 1 to 27.

Aspect 30 is a computer-readable medium storing computer executable code, where the code when executed by a processor causes the processor to implement any of aspects 1 to 27.

What is claimed is:

1. An apparatus for wireless communication at an integrated access backhaul (IAB) node comprising:
a memory; and
at least one processor coupled to the memory and configured to:
receive a configuration for a first set of reference signals associated with an IAB mobile termination (MT) (IAB-MT) function of the IAB node, wherein the first set of reference signals overlaps in time with a second set of time periods associated with an IAB distributed unit (DU) (IAB-DU) function of the IAB node; and
extend an IAB-MT reference-signal measurement period of the IAB node by scaling a baseline reference-signal measurement period with a scaling factor provided by a network or selected from a plurality of candidate values for the scaling factor based on the overlap between the first set of reference signals for measurement with the IAB-MT function of the IAB node and the second set of time periods associated with the IAB-DU function of the IAB node.

2. The apparatus of claim 1, wherein the scaling factor is based on the overlap between the first set of reference signals associated with the IAB-MT function and the second set of time periods associated with the IAB-DU function.

3. The apparatus of claim 1, the at least one processor further configured to:
receive, from the network, a scaling factor configuration indicating the scaling factor.

4. The apparatus of claim 3, wherein the scaling factor configuration is received via at least one of a radio resource control (RRC) message, a media access control (MAC) control element (CE) (MAC-CE), or downlink control information (DCI).

5. The apparatus of claim 3, the at least one processor further configured to:
transmit a request for the extended reference signal measurement period via at least one of a physical uplink shared channel (PUSCH) or a physical uplink control channel (PUCCH).

6. The apparatus of claim 1, the at least one processor further configured to:
receive, from a network, the plurality of candidate values for the scaling factor; and
select a value from the plurality of candidate values for the scaling factor based on the overlap of the first set of reference signals and the second set of time periods.

7. The apparatus of claim 1, wherein extending the IAB-MT reference-signal measurement period is further based on one or more of a periodicity of a SS Block Measurement Timing Configuration (SMTC) and a measurement gap (MG) configuration.

8. The apparatus of claim 1, wherein the configuration of the first set of reference signals comprises at least one of a radio link monitoring reference signal configuration, a beam failure detection reference signal configuration, a candidate beam detection reference signal configuration, a synchronization signal block (SSB) measurement and timing configuration (SMTC), or a measurement gap (MG) configuration.

9. The apparatus of claim 1, wherein the first set of reference signals comprises at least one of a synchronization signal blocks (SSB), or a channel state information reference signals (CSI-RS).

10. The apparatus of claim 1, wherein the second set of time periods is associated with hard time resources for the IAB-DU function that are not available for the measurement of the first set of reference signals by the IAB-MT function.

11. The apparatus of claim 1, wherein the second set of time periods comprise flexible time resources that have been released to the IAB node.

12. The apparatus of claim 1, wherein the second set of time periods comprise cell-specific communication time resources.

13. The apparatus of claim 12, wherein the cell-specific communication time resources are for at least one of a synchronization signal block (SSB), a random access channel (RACH) communication, a system information communication, or a paging communication.

14. The apparatus of claim 1, wherein the second set of time periods comprise guard symbols at the IAB node for switching between the IAB-MT function and the IAB-DU function.

15. The apparatus of claim 1, the at least one processor further configured to:

perform at least one measurement of the first set of reference signals based on an extension of the IAB-MT reference-signal measurement period.

16. The apparatus of claim 15, wherein the at least one measurement includes one or more of radio link monitoring, beam failure detection, a cell detection measurement, or an intra-frequency neighbor cell measurement.

17. The apparatus of claim 1, further comprising at least one transceiver coupled to the at least one processor.

18. An apparatus for wireless communication at a network node comprising:
   a memory; and
   at least one processor coupled to the memory and configured to:
      output, to an integrated access backhaul (IAB) node, a reference signal configuration for measurement of a first set of reference signals with an IAB mobile termination (IAB-MT) function of the IAB node; and
      output, to the IAB node, a scaling factor configuration comprising a scaling factor, or a plurality of candidate values for the scaling factor, for extending an IAB-MT reference-signal measurement period based on an overlap between the first set of reference signals for measurement with the IAB-MT function of the IAB node and a second set of time periods associated with an IAB distributed unit (DU) (IAB-DU) function of the IAB node.

19. The apparatus of claim 18, wherein configuring the IAB node with the scaling factor comprises:
   transmitting the scaling factor configuration via at least one of a radio resource control (RRC) message, a media access control (MAC) control element (CE) (MAC-CE), or downlink control information (DCI).

20. The apparatus of claim 18, the at least one processor further configured to:
   receive a request for the extended reference signal measurement period via at least one of a physical uplink shared channel (PUSCH) or a physical uplink control channel (PUCCH) from the IAB node.

21. The apparatus of claim 18, wherein configuring the scaling factor includes transmitting the plurality of candidate values for the scaling factor that are selectable based on the overlap of the first set of reference signals and the second set of time periods.

22. The apparatus of claim 18, the first set of reference signals comprises at least one of radio link monitoring reference signals, beam failure detection reference signals, candidate beam detection reference signals, a synchronization signal block (SSB) measurement and timing configuration (SMTC), or a measurement gap (MG) configuration.

23. The apparatus of claim 18, wherein the first set of reference signals comprises at least one of a synchronization signal blocks (SSB), or a channel state information reference signals (CSI-RS).

24. The apparatus of claim 18, wherein the second set of time periods comprise one or more of hard time resources for the IAB-DU function that are not available for the measurement of the first set of reference signals by the IAB-MT function, flexible time resources that have been released to the IAB node by a network node, cell-specific communication time resources, or guard symbols at the IAB node that for switching between the IAB-MT function and the IAB-DU function.

25. The apparatus of claim 18, wherein the measurement includes one or more of radio link monitoring, beam failure detection, a cell detection measurement, or an intra-frequency neighbor cell measurement.

26. A method of wireless communication at an integrated access backhaul (IAB) node, comprising:
   receiving a configuration for a first set of reference signals associated with an IAB mobile termination (MT) (IAB-MT) function of the IAB node, wherein the first set of reference signals overlaps in time with a second set of time periods associated with an IAB distributed unit (DU) (IAB-DU) function of the IAB node; and
   extending an IAB-MT reference-signal measurement period of the IAB node by scaling a baseline reference-signal measurement period with a scaling factor provided by a network or selected from a plurality of candidate values for the scaling factor based on the overlap between the first set of reference signals for measurement with the IAB-MT function of the IAB node and the second set of time periods associated with the IAB-DU function of the IAB node.

27. The method of claim 26, wherein the scaling factor is based on the overlap between the first set of reference signals associated with the IAB-MT function and the second set of time periods associated with the IAB-DU function.

28. A method of wireless communication at a network node, comprising:
   outputting, to an integrated access backhaul (IAB) node, a reference signal configuration for measurement of a first set of reference signals with an IAB mobile termination (IAB-MT) function of the IAB node; and
   outputting, to the IAB node, a scaling factor configuration comprising a scaling factor, or a plurality of candidate values for the scaling factor, for extending an IAB-MT reference-signal measurement period based on an overlap between the first set of reference signals for measurement with the IAB-MT function of the IAB node and a second set of time periods associated with an IAB distributed unit (DU) (IAB-DU) function of the IAB node.

29. The method of claim 28, wherein outputting the scaling factor configuration configuring the IAB node with the scaling factor or the plurality of candidate values for the scaling factor comprises:
   transmitting the scaling factor configuration via at least one of a radio resource control (RRC) message, a media access control (MAC) control element (CE) (MAC-CE), or downlink control information (DCI).

* * * * *